United States Patent
Hwang et al.

(10) Patent No.: US 10,993,070 B2
(45) Date of Patent: Apr. 27, 2021

(54) ELECTRONIC APPARATUS AND METHOD FOR PROVIDING IDENTIFICATION INFORMATION

(71) Applicant: Samsung Electronics Co., Ltd., Gyeonggi-do (KR)

(72) Inventors: Inhwan Hwang, Gyeonggi-do (KR); Taegun Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/085,841

(22) PCT Filed: Mar. 24, 2017

(86) PCT No.: PCT/KR2017/003193
§ 371 (c)(1),
(2) Date: Sep. 17, 2018

(87) PCT Pub. No.: WO2017/175996
PCT Pub. Date: Oct. 12, 2017

(65) Prior Publication Data
US 2019/0098444 A1    Mar. 28, 2019

(30) Foreign Application Priority Data

Apr. 5, 2016    (KR) ................. 10-2016-0041913

(51) Int. Cl.
*H04W 4/021*    (2018.01)
*H04W 88/06*    (2009.01)
(Continued)

(52) U.S. Cl.
CPC ............ *H04W 4/021* (2013.01); *H04B 17/27* (2015.01); *H04W 4/023* (2013.01); *H04W 4/029* (2018.02);
(Continued)

(58) Field of Classification Search
CPC combination set(s) only.
See application file for complete search history.

(56) References Cited

U.S. PATENT DOCUMENTS

| | | |
|---|---|---|
| RE42,927 E | 11/2011 | Want et al. |
| 8,886,173 B2 * | 11/2014 | Davies ............... H04W 72/048 |
| | | 455/414.3 |

(Continued)

FOREIGN PATENT DOCUMENTS

| | | |
|---|---|---|
| KR | 1020020047809 | 6/2002 |
| KR | 1020140090001 | 7/2014 |

(Continued)

OTHER PUBLICATIONS

PCT/ISA/210 Search Report issued on PCT/KR2017/003193 (pp. 3).

(Continued)

*Primary Examiner* — Steven S Kelley
(74) *Attorney, Agent, or Firm* — The Farrell Law Firm, P.C.

(57) ABSTRACT

The present invention relates to an electronic apparatus, and relates to an electronic apparatus and a method for providing service information. To this end, the present invention provides an electronic apparatus comprising: a first communication module; a second communication module; a memory for storing location information of the electronic apparatus; and a processor, wherein the processor may be configured to: acquire identification information corresponding to a place where a first external electronic apparatus is located, from the first external electronic apparatus located near the electronic apparatus, using the first communication module; transmit the identification information and the location information to a second external electronic apparatus, using the second communication module; and receive service information corresponding to the identifica- (Continued)

tion information from the second external electronic apparatus, using the second communication module.

13 Claims, 9 Drawing Sheets

(51) Int. Cl.
| | | |
|---|---|---|
| *H04W 12/08* | (2021.01) | |
| *H04W 4/02* | (2018.01) | |
| *H04W 4/029* | (2018.01) | |
| *H04W 12/00* | (2021.01) | |
| *H04W 4/80* | (2018.01) | |
| *H04B 17/27* | (2015.01) | |
| *H04L 29/06* | (2006.01) | |

(52) U.S. Cl.
CPC ........... *H04W 12/08* (2013.01); *H04W 88/06* (2013.01); *H04L 63/107* (2013.01); *H04W 4/80* (2018.02); *H04W 12/00503* (2019.01)

(56) References Cited

U.S. PATENT DOCUMENTS

| | | | |
|---|---|---|---|
| 2002/0077062 A1 | 6/2002 | An et al. | |
| 2011/0105152 A1* | 5/2011 | Yu | H04W 4/026 455/456.3 |
| 2012/0158297 A1 | 6/2012 | Kim et al. | |
| 2013/0079033 A1 | 3/2013 | Gupta et al. | |
| 2013/0260797 A1* | 10/2013 | Jones | H04W 4/029 455/456.3 |
| 2014/0302879 A1 | 10/2014 | Kim et al. | |
| 2015/0018011 A1* | 1/2015 | Mendelson | G01C 21/206 455/456.3 |
| 2015/0339861 A1 | 11/2015 | Yun et al. | |
| 2015/0351070 A1 | 12/2015 | Lee et al. | |
| 2015/0358778 A1 | 12/2015 | Heo et al. | |
| 2016/0021500 A1 | 1/2016 | Won | |
| 2016/0044450 A1* | 2/2016 | Huh | H04W 4/029 455/456.3 |
| 2016/0066123 A1* | 3/2016 | Ko | H04B 17/318 |
| 2016/0302036 A1* | 10/2016 | Chan | H04W 4/025 |
| 2017/0285722 A1 | 10/2017 | Kim | |

FOREIGN PATENT DOCUMENTS

| | | |
|---|---|---|
| KR | 1020150089822 | 8/2015 |
| KR | 1020150140021 | 12/2015 |
| KR | 1020160028146 | 3/2016 |
| WO | WO 2016032022 | 3/2016 |

OTHER PUBLICATIONS

PCT/ISA/237 Written Opinion issued on PCT/KR2017/003193 (pp. 6).

European Search Report dated Nov. 13, 2018 issued in counterpart application No. 17779296.7-1218, 8 pages.

* cited by examiner

US 10,993,070 B2

ELECTRONIC APPARATUS AND METHOD FOR PROVIDING IDENTIFICATION INFORMATION

PRIORITY

This application is a National Phase Entry of PCT International Application No. PCT/KR2017/003193 which was filed on Mar. 24, 2017, and claims priority to Korean Patent Application No. 10-2016-0041913, which was filed on Apr. 5, 2016, the content of each of which is incorporated herein by reference.

TECHNICAL FIELD

The present invention relates to an electronic device and particularly to an electronic device and method for providing identification information.

BACKGROUND ART

An electronic device provides various services and additional functions. In order to increase the utility value of such an electronic device and satisfy various needs of users, communication service providers and electronic device manufacturers are competitively offering more various functions and are developing differentiated electronic devices. As one example of satisfying user needs, the electronic device may receive information about various services available in a specific area from a server and provide it to a user when the user is adjacent to or enters the specific area.

DISCLOSURE OF INVENTION

Technical Problem

Typically, the electronic device receives in advance a list of transmitters and provides service information through comparison with a transmitter located in a specific area. This has problems that a process of receiving in advance the transmitter list causes data traffic and inconsistency with actual information due to a time difference occurs.

In addition, the typical electronic device which is adjacent to or enters a specific area determines a distance to the transmitter only through signal strength. This causes a problem incapable of accurately determining the distance due to signal interference by peripheral devices and signal distortion by surrounding structures. Also, because the transmitter broadcasts a signal once every 1 to 10 seconds, the electronic device has to wait to receive a plurality of signals.

Further, the typical electronic device fails to provide different services depending on distances to the transmitter and current circumstances.

As described above, since the distance between the transmitter and the electronic device is determined based only on signal strength, the typical electronic device fails to provide an adaptive service for various motions thereof in a specific area.

Therefore, it is necessary that the transmitter sends identification information (e.g., business information) to the electronic device and that the electronic device receives service information based on received identification information and location information thereof and then provides the service information to the user. Also, there is a need to provide the user with various kinds of service information in accordance with the motion of the electronic device in a specific area.

Solution to Problem

According to various embodiments of the present invention, an electronic device may include a communication module; a sensor; and a processor. The processor may be configured to acquire, by using the communication module, a signal from an external electronic device, the signal including one or more identification information corresponding to the external electronic device; to detect, by using the sensor, a movement of the electronic device; select first identification information of the at least one identification information when the movement satisfies a first condition; to select second identification information of the at least one identification information when the movement satisfies a second condition; and to provide service information corresponding to the selected first or second identification information.

In addition, according to various embodiments of the present invention, an electronic device may comprise a first communication module, a second communication module, a memory configured to store location information of the electronic device, and a processor. The processor may be configured to acquire, from a first external electronic device located at a short distance from the electronic device, identification information corresponding to a place where the first external electronic device is located, by using the first communication module, to transmit the identification information and the location information to a second external electronic device by using the second communication module, and to receive service information corresponding to the identification information from the second external electronic device by using the second communication module.

In addition, according to various embodiments of the present invention, a method for providing service information in an electronic device may comprise operations of acquiring, from a first external electronic device located at a short distance from the electronic device, identification information corresponding to a place where the first external electronic device is located, transmitting the identification information and location information of the electronic device to a second external electronic device, and receiving service information corresponding to the identification information from the second external electronic device.

Advantageous Effects of Invention

According to various embodiments of the present invention, an electronic device may prevent unnecessary data communication by not receiving a list of a plurality of transmitters in advance to provide the service information to a user.

In addition, by identifying a distance between an electronic device and a transmitter by using both the strength of a signal transmitted from the transmitter and location information according to a movement of the electronic device, the present invention can accurately identify a location of the electronic device even in an indoor place and also provide various kinds of service information to the user, based on the accurate location of the electronic device.

In addition, it is possible to provide various kinds of service information depending on entry into or departure from a specific area, based on walking information of a user having an electronic device.

MODE FOR THE INVENTION

Figure 1:
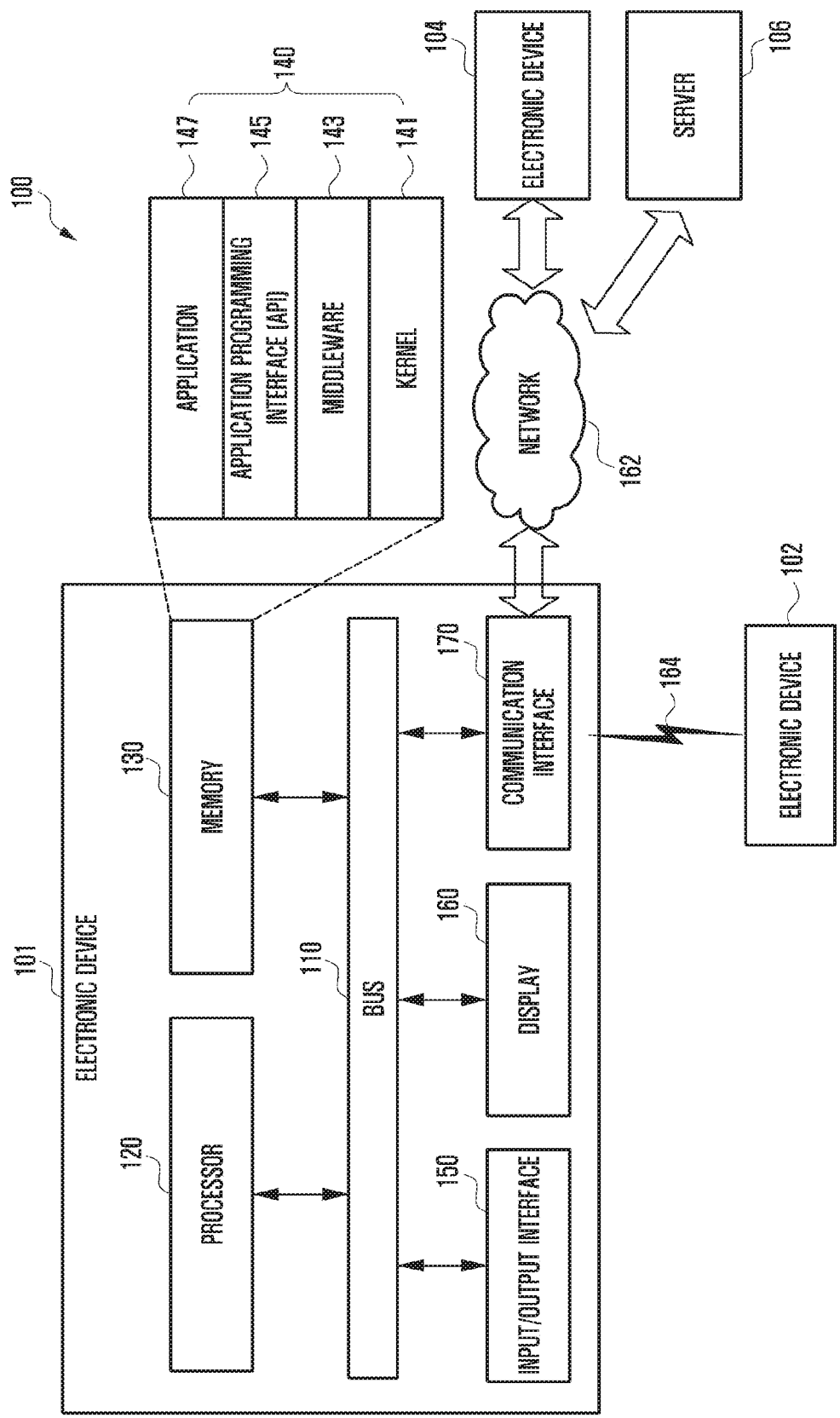
FIG. 1 is an exemplary diagram illustrating an electronic device in a network environment according to various embodiments.

Hereinafter, various embodiments of the present disclosure are described with reference to the accompanying drawings. It should be understood that embodiments and terminology used therein are not intended to limit the disclosed technique to particular implementation, but various modifications, equivalents, and/or alternatives of the embodiments are included. In the description of the drawings, like reference numerals may be used for similar elements.

In this disclosure, the terms such as "comprise", "include", and "have" denote the presence of stated elements, components, operations, functions, features, and the like, but do not exclude the presence of or a possibility of addition of one or more other elements, components, operations, functions, features, and the like.

In this disclosure, the expressions "A or B", "at least one of A and/or B", and the like may include all possible combinations of items listed together. For example, "A or B", "at least one of A and B", or "at least one of A or B" may indicate all of (1) including at least one A, (2) including at least one B, and (3) including both of at least one A and at least one B.

The expressions including ordinal numbers, such as "first" and "second," may indicate various elements. The above expressions do not limit the sequence or importance of the elements, and are used merely for the purpose to distinguish one element from the others. For example, a first electronic device and a second electronic device may indicate different electronic devices regardless of the sequence or importance thereof. For example, without departing from the scope of the present disclosure, a first element may be referred to as a second element, and similarly a second element may be also referred to as a first element.

When a certain element (e.g., first element) is referred to as being "connected" or "coupled" (operatively or communicatively) to another element (e.g., second element), it may mean that the first element is connected or coupled directly to the second element or indirectly through any other element (e.g., third element). On the other hand, when a certain element (e.g., first element) is referred to as being "directly connected" or "directly coupled" to another element (e.g., second element), it may be understood that there is no element (e.g., third element) therebetween.

The expression "configured to" may be interchangeably used with any other expressions "suitable for", "having the ability to", "designed to", "adapted to", "made to", "being able to", and "capable of". The expression "device configured to" may mean that the device, together with other devices or components, "is able to". For example, the phrase "processor configured to perform A, B and C" may mean a dedicated processor (e.g., embedded processor) for performing corresponding operations or a generic-purpose processor (e.g., central processing unit (CPU) or application processor (AP)) capable of performing corresponding operations by executing one or more software programs stored in a memory.

Terms used herein may be merely to describe a certain embodiment, and may not be intended to limit the scope of other embodiments. The singular expressions may include plural expressions unless the context clearly dictates otherwise. Terms used herein, including technical or scientific terms, may have the same meaning as commonly understood by those skilled in the art. Some terms defined in a normal dictionary may be interpreted as having the same or similar meaning as the contextual meanings in the related art. Certain terms are not to be construed as an ideal or overly formal detect unless expressly defined to the contrary herein. In some cases, the terms defined herein cannot be construed to exclude embodiments of the present disclosure.

An electronic device according to various embodiments of this disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a portable medical device, a digital camera, or a wearable device. According to various embodiments, the wearable device may include at least one of an accessory-type device (e.g., a watch, a ring, a bracelet, an anklet, a necklace, glasses, a contact lens, or a head-mounted device (HMD), a fabric- or cloth-type device (e.g., electronic cloth), a body-attached type device (e.g., a skin pad or tattoo), or a body-implemented type circuit.

In some embodiments, the electronic device may be home appliance. For example, the home appliance may include at least one of a TV, a digital video disk (DVD) player, audio equipment, a refrigerator, an air conditioner, a vacuum cleaner, an oven, a microwave, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic picture frame.

In another embodiment, the electronic device may include at least one of a medical device (e.g., portable medical measuring equipment (e.g., a blood sugar meter, a heart rate meter, a blood pressure meter, a clinical thermometer, etc.), a magnetic resonance angiography (MRA), a magnetic resonance imaging (MRI), a computed tomography (CT), an ultrasonography, etc.), a navigation device, a global navigation satellite system (GNSS), an event data recorder (EDR), a flight data recorder (FDR), a car infotainment device, electronic equipment for ship (e.g., a marine navigation system, a gyrocompass, etc.), avionics, security equipment, a car head unit, an industrial or home robot, an automated teller machine (ATM), a point of sales (POS), or a device for internet of things (IoT) (e.g., a bulb, a sensor, a sprinkler, a fire alarm, a thermostat, a streetlight, a toaster, athletic equipment, a hot-water tank, a heater, a boiler, etc.).

In a certain embodiment, the electronic device may be include at least one of furniture, a part of a building/construction or car, an electronic board, an electronic signature receiving device, a projector, or various measuring instruments (e.g., a water meter, an electric meter, a gas meter, a wave meter, etc.). In various embodiments, the electronic device may be one of the above-mentioned devices or a combination thereof. The electronic device according to a certain embodiment may be a flexible electronic device. The electronic device according to embodiments disclosed herein is not limited to the above-mentioned devices and may include new electronic devices to be launched with the growth of technology.

Hereinafter, an electronic device according to various embodiments will be described. In this disclosure, the term user may refer to a person or a device (e.g., an artificial intelligence device) using the electronic device.

FIG. 1 shows an electronic device 101 in a network environment 100 according to various embodiments.

The electronic device 100 may include a bus 110, a processor 120, a memory 130, an input/output (I/O) interface 150, a display 160, and a communication interface 170. In a certain embodiment, the electronic device 101 may omit at least one of the above elements or further include any other element.

The bus 110 may be a circuit which interconnects the above elements 120 to 170 and delivers a communication (e.g., a control message and/or data) between the above elements.

The processor 120 may include at least one of a central processing unit (CPU), an application processor (AP), or a communication processor (CP). The processor 120 may execute an operation or data processing for control and/or communication of at least one of other elements.

The memory 130 may include volatile and/or non-volatile memory. The memory 130 may store instructions or data related to at least one element of the electronic device 101. According to an embodiment, the memory 130 may store software and/or programs 140. The programs 140 may include, for example, a kernel 141, a middleware 143, an application programming interface (API) 145, and/or an application program (or application) 147. At least some of the kernel 141, the middleware 143, and the API 145 may be referred to as an operating system (OS).

The kernel 141 may control or manage system resources (e.g., the bus 110, the processor 120, the memory 130, etc.) used to execute operations or functions implemented in other programs (e.g., the middleware 143, the API 145, and the application program 147). Also, the kernel 141 may provide an interface capable of accessing individual elements of the electronic device 101 through the middleware 143, the API 145, or the application program 147, and thereby controlling or managing system resources.

The middleware 143 may perform a function of an intermediary so that the API 145 or the application program 147 communicates with the kernel 143 and thereby exchanges data.

In addition, the middleware 143 may process one or more work requests, received from the application program 147, according to priorities. For example, the middleware 143 may assign, to the application program 147, a priority for using system resources (e.g., the bus 110, the processor 120, the memory 130, etc.) of the electronic device 101 and then process the one or more work requests.

The API 145 is an interface through which the application 147 controls a function provided by the kernel 141 or the middleware 143, and may include, for example, at least one interface or function (e.g., instructions) for file control, window control, image processing, character control, and/or the like.

The I/O interface 150 may transmit commands or data, inputted from a user or other external device, to other element(s) of the electronic device 101, or output commands or data, received from other element(s) of the electronic device 101, to a user or other external device.

The display 160 may include, for example, a liquid crystal display (LCD), a light-emitting diode (LED) display, an organic light-emitting diode (OLED) display, a micro-electro-mechanical systems (MEMS) display, or an electronic paper display. The display 160 may display, for example, various contents (e.g., text, image, video, icon, symbol, etc.) to a user. The display 160 may include a touch screen and may receive, for example, a touch, gesture, proximity, or hovering input using an electronic pen or a portion of the user's body.

The communication interface 170 may establish communication between the electronic device 101 and an external device (e.g., a first external electronic device 102, a second external electronic device 104, or a server 106. For example, the communication interface 170 may be connected to the network 162 via wireless or wired communication and communicate with an external device (e.g., the second external electronic device 104 or the server 106).

The wireless communication may include cellular communication using at least one of, for example, LTE, LTE Advance (LTE-A), code division multiple access (CDMA), wideband CDMA (WCDMA), universal mobile telecommunications system (UMTS), wireless broadband (WiBro), global system for mobile communications (GSM), and the like. According to an embodiment, the wireless communication may include at least one of, for example, wireless fidelity (WiFi), Bluetooth, Bluetooth low power (BLE), Zigbee, near field communication (NFC), magnetic secure transmission, radio frequency (RF), or body area network (BAN). According to an embodiment, the wireless communication may include GNSS. The GNSS may be, for example, global positioning system (GPS), global navigation satellite system (Glonass), Beidou navigation satellite system (Beidou), or Galileo, the European global satellite-based navigation system. Hereinafter, in this disclosure, "GPS" may be used interchangeably with "GNSS". The wired communications may include at least one of, for example, a universal serial bus (USB), a high definition multimedia interface (HDMI), a recommended standard 232 (RS-232), a power line communication, or a plain old telephone service (POTS). The network 162 may include a telecommunications network, for example, at least one of a computer network (e.g., LAN or WAN), the Internet, or a telephone network.

Each of the first and second external electronic devices 102 and 104 may be similar to or different from the electronic device 101 in types. According to various embodiments, all or part of operations performed in the electronic device 101 may be performed in another electronic device or multiple electronic devices (e.g., the electronic devices 102 and 104 and the server 106). According to an embodiment, in case of having to perform a certain function or service automatically or on demand, the electronic device 101 may request any other electronic device (e.g., the electronic device 102 or 104 or the server 106) to perform at least part of the function or service rather than or in addition to autonomously performing the function or service. Then, the other electronic device (e.g., the electronic device 102 or 104 or the server 106) may perform the requested function or service and return a result to the electronic device 101. The electronic device 101 may provide the requested function or service by using or further processing the received result. For this, cloud computing technique, distributed computing technique, or client-server computing technique may be utilized for example.

Figure 2:
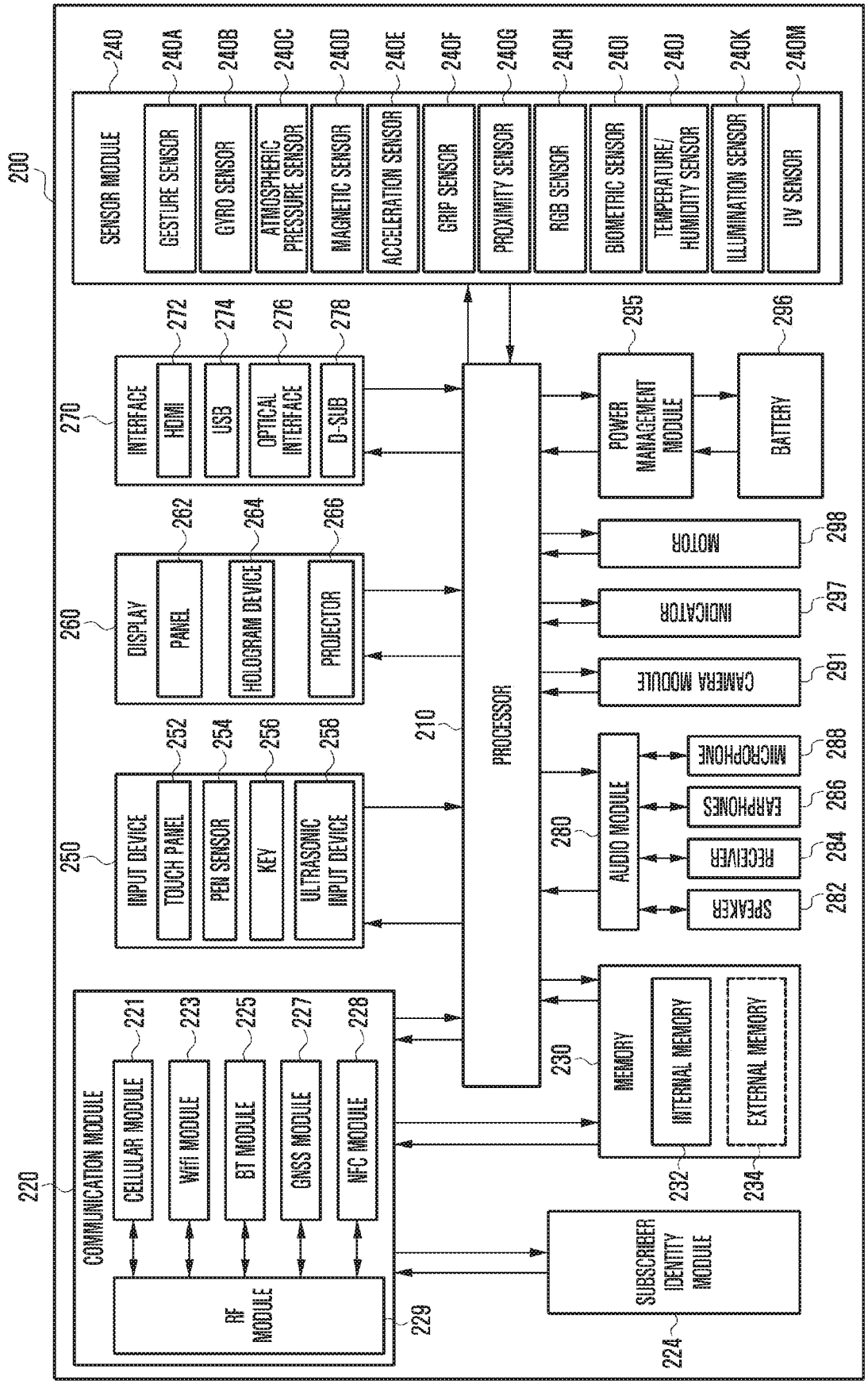
FIG. 2 is a block diagram illustrating an electronic device according to various embodiments.

FIG. 2 is a block diagram illustrating an electronic device 201 according to embodiments.

The electronic device 201 may include, for example, the whole or part of the electronic device 101 shown in FIG. 1. The electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may execute an operating system (OS) or an application program, control multiple hardware or software components connected to the processor 210, and perform processing and operations on various data. The processor 210 may be implemented by, for example, a system on chip (SoC). According to an embodiment, the processor 210 may further include a graphic processing unit (GPU) and/or an image signal processor. The processor 210 may include at least some of elements shown in FIG. 2 (e.g., a cellular module 221). The processor 210 may load and process instructions or data received from at least one of the other elements (e.g., non-volatile memory) into volatile memory and then store the resulting data in non-volatile memory.

The communication module 220 may be, for example, the communication module 170 shown in FIG. 1. The communication module 220 may include, for example, a cellular module 221, a Wi-Fi module 223, a Bluetooth (BT) module 225, a GNSS module 227, an NFC module 228, and a radio frequency (RF) module 229.

The cellular module 221 may provide a voice call, a video call, a messaging service, or an Internet service, for example, through a communication network. According to an embodiment, the cellular module 221 may utilize the subscriber identity module (e.g., a SIM card) 224 to perform the identification and authentication of the electronic device 201 in the communication network. According to an embodiment, the cellular module 221 may perform at least some of functions that the processor 210 may provide. According to an embodiment, the cellular module 221 may include a communications processor (CP).

Each of the WiFi module 223, the Bluetooth module 225, the GNSS module 227, and the NFC module 228 may include a processor for processing data transmitted or received therethrough. According to a certain embodiment, at least some (e.g., two or more) of the cellular module 221, the WiFi module 223, the Bluetooth module 225, the GNSS module 227, or the NFC module 228 may be included in an integrated chip (IC) or an IC package.

The RF module 229 may, for example, transmit and receive communication signals (e.g., RF signals). The RF module 229 may include, for example, a transceiver, a power amplifier module (PAM), a frequency filter, a low noise amplifier (LNA), or an antenna. According to another embodiment, at least one of the cellular module 221, the WiFi module 223, the Bluetooth module 225, the GNSS module 227, or the NFC module 228 may transmit and receive RF signals through separate RF modules.

The SIM 224 may include, for example, a card having SIM or an embedded SIM, and may include unique identification information (e.g., an integrated circuit card identifier (ICCID), or an international mobile subscriber identity (IMSI)).

The memory 230 (e.g., the memory 130 shown in FIG. 1) may include an internal memory 232 and an external memory 234. The internal memory 232 may include, for example, at least one of a volatile memory (e.g., a DRAM, an SRAM, or SDRAM), and a non-volatile memory (e.g., a one time programmable ROM (OTPROM), a PROM, an EPROM, an EEPROM, a mask ROM, a flash ROM, a flash memory, a hard drive, or a solid state drive (SSD)).

The external memory 234 may include a flash drive, for example, a compact flash (CF), a secure digital (SD), a micro-SD, a mini-SD, an extreme Digital (xD), or a memory stick. The external memory 234 may be functionally or physically connected to the electronic device 201 through various interfaces.

The sensor module 240 may, for example, measure a physical quantity or detect an operating state of the electronic device 201 and convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green and blue) sensor), a biometric sensor 240I, a temperature/humidity sensor 240J, an illuminance sensor 240K, or a ultra violet (UV) sensor 240M. Additionally or alternatively, the sensor module 240 may include, for example, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In a certain embodiment, the electronic device 201 further includes a processor configured to control the sensor module 240, either as part of the processor 210 or separately, to control the sensor module 240 while the processor 210 is in a sleep state.

The input device 250 may include various input circuitry, such as, for example, and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 through an input tool that generates ultrasonic signals, thus allowing wireless recognition.

The display 260 (e.g., the display 160) may include a panel 262, a hologram 264, a projector 266, and/or a control circuit for controlling them. The panel 262 may have a flexible, transparent or wearable form. The panel 262 may be formed of a single module with the touch panel 252. In a certain embodiment, the panel 262 may include a pressure sensor (or a force sensor which will be interchangeably used hereinafter) capable of measuring a pressure of a user's touch. The pressure sensor may be incorporated into the touch panel 252 or formed separately from the touch panel 252. The hologram 264 may show a stereoscopic image in the air using interference of light. The projector 266 may project an image onto a screen, which may be located at the inside or outside of the electronic device 201.

The interface 270 may include various interface circuitry, such as, for example, and without limitation, an HDMI (High-Definition Multimedia Interface) 272, a USB (Universal Serial Bus) 274, an optical interface 276, or a D-sub (D-subminiature) 278. The interface 270 may be contained, for example, in the communication interface 170 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least parts of the audio module 280 may be included, for example, in the I/O interface 145 shown in FIG. 1. The audio module 280 may process sound information inputted or outputted through a speaker 282, a receiver 284, an earphone 286, or a microphone 288.

The camera module 291 is a device capable of acquiring still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown). The image sensor may include an integrated circuit photoelectric conversion device using a manufacturing technique of a semiconductor device.

The power management module 295 may manage electric power of the electronic device 201. Although not shown, the power management module 295 may include, for example, a PMIC (Power Management Integrated Circuit), a charger IC, or a battery or fuel gauge. The PMIC may have wired and/or wireless charging types. A wireless charging type may include, for example, a magnetic resonance type, a magnetic induction type, or an electromagnetic type. Any additional circuit for a wireless charging may be further used such as a coil loop, a resonance circuit, or a rectifier. The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of DMB (Digital Multimedia Broadcasting), DVB (Digital Video Broadcasting), or mediaFlo™.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

Figure 3:
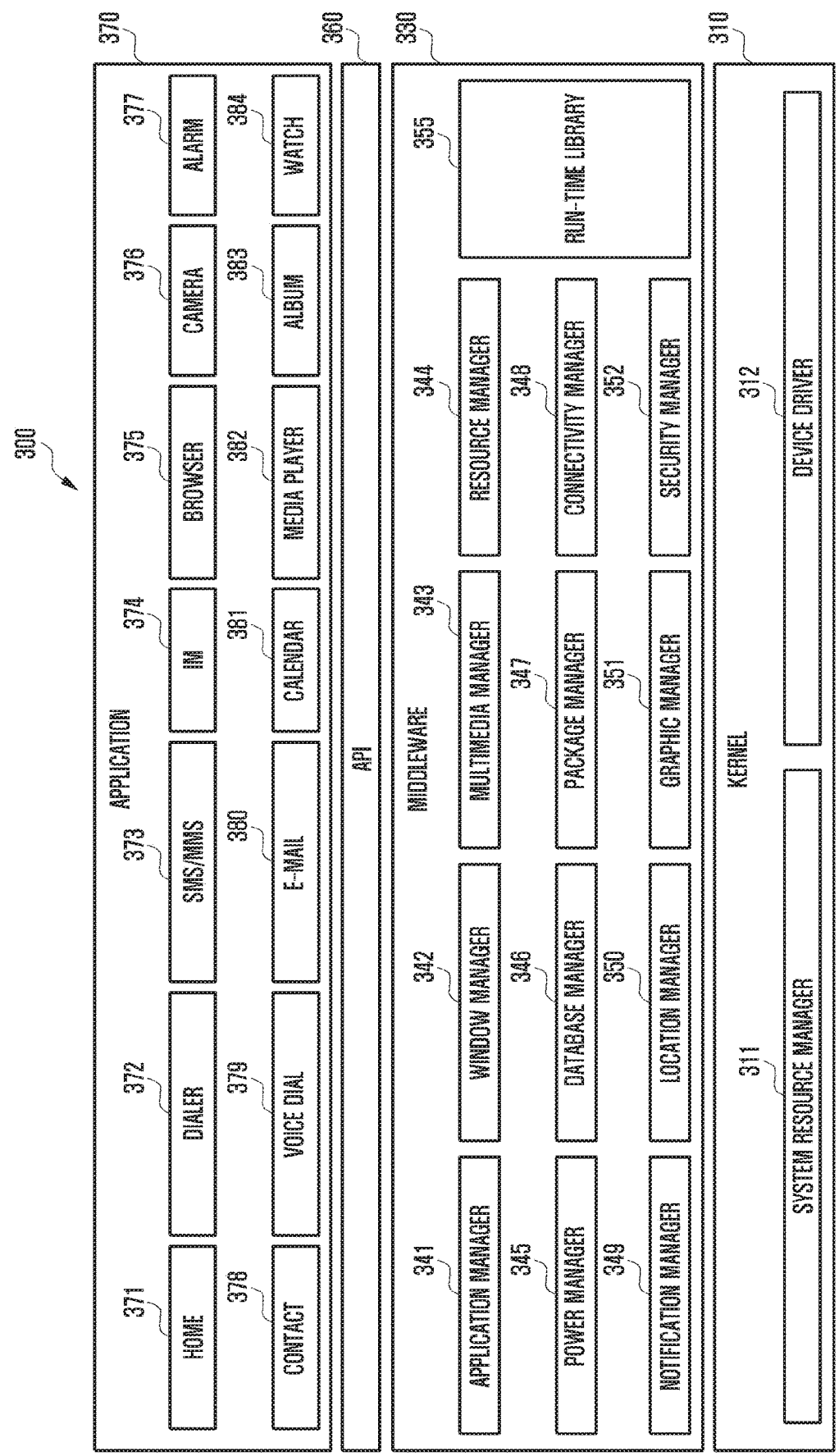
FIG. 3 is a block diagram illustrating a program module according to various embodiments.

FIG. 3 is a block diagram illustrating a program module according to various embodiments.

According to one embodiment, the program module 310 (e.g., the program 140) may include an OS controlling resources related to an electronic device (e.g., the electronic device 101) and/or various applications (e.g., the application program 147) executed in the OS. For example, the OS may be Android™, iOS™, Windows™, Symbian™, Tizen™, Bada™, and the like.

The program module 310 may include a kernel 320 (e.g., the kernel 141), a middleware 330 (e.g., the middleware 143), an API 360 (e.g., the API 145), and/or the application 370 (e.g., the application program 147). At least a part of the program module 310 may be preloaded in the electronic device or downloaded from an external electronic device (e.g., the electronic device 102, 104 or the server 106).

The kernel 320 may include a system resource manager 321 and/or a device driver 323. The system resource manager 321 may perform the control, allocation, recovery, and/or the like of system resources. According to one embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. For example, when at least two displays 260 are connected, the screen may be differently configured or managed in response to the ratio of the screen or the action of the application 370. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment, when the electronic device (e.g., the electronic device 101) has a telephone function, the middleware 330 may further include a telephony manager for managing a voice telephony call function and/or a video telephony call function of the electronic device.

The middleware 330 may include a middleware module for forming various functional combinations of the above-described elements. The middleware 330 may provide modules specialized according to types of OSs in order to provide differentiated functions. Also, the middleware 330 may dynamically delete some of the existing elements, or may add new elements.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, or at least one application capable of performing functions such as health care (e.g., measurement of exercise amount or blood glucose) or environmental information provision (e.g., providing information about air pressure, humidity, temperature, or the like).

According to one embodiment, the applications 370 may include an application (hereinafter, referred to as "information exchange application") that supports the exchange of information between the electronic device (e.g., 101) and an external electronic device (e.g., 102 or 104). The information exchange application may include, for example, a notification relay application for delivering specific information to the external electronic device, or a device management application for managing the external electronic device.

For example, the notification relay application may have a function of sending notification information generated in other applications (e.g., the SMS/MMS application, the email application, the healthcare application, or the environmental information application) of the electronic device to the external electronic device (e.g., 102 or 104). Further, the notification relay application may receive notification information from the external electronic device and provide it to the user.

The device management application may manage (e.g., install, delete, or update) at least one function (e.g., turn-on/turn-off of the external electronic device itself or some components thereof or adjusting the brightness or resolution of the display) of the external electronic device (e.g., 102 or 104), at least one application running in the external electronic device, or at least one service (e.g., a call service or a message service) provided in the external electronic device.

According to one embodiment, the applications 370 may include an application (e.g., a healthcare application of a mobile medical device, etc.) designated depending on the attributes of the external electronic device (e.g., 102 or 104). According to one embodiment, the applications 370 may include an application received from the external electronic device (e.g., the server 106 or the electronic device 102 or 104). According to one embodiment, the applications 370 may include a preloaded application or a third party application downloadable from a server. The names of elements of the program module 310 according to the illustrated embodiment may be varied depending on the type of the operating system.

According to various embodiments, at least a part of the program module 310 may be implemented in software, firmware, hardware, or a combination thereof. At least a part of the program module 310 may be implemented (e.g., executed) by, for example, a processor (e.g., 210). At least a part of the program module 310 may include, for example, modules, programs, routines, sets of instructions, or processes to perform one or more functions.

Figure 4:
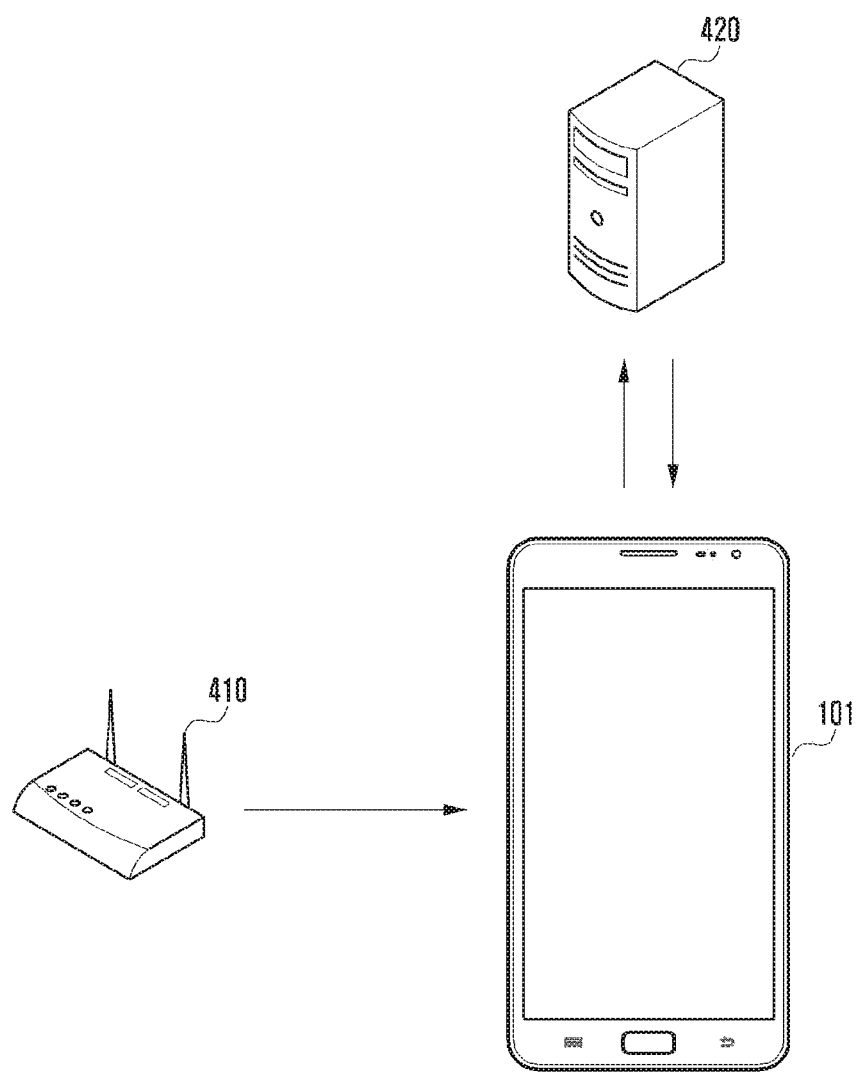
FIG. 4 is an exemplary diagram illustrating a system for providing service information according to an embodiment of the present invention.

FIG. 4 is an exemplary diagram illustrating a system for providing service information according to an embodiment of the present invention.

Referring to FIG. 4, the system for providing service information according to an embodiment of the present invention may include a transmitter 410, a server 420, and an electronic device 101.

The transmitter 410 may perform at least one function or operation performed by one of the electronic devices 102 and 104 of FIG. 1. The electronic device 101 may perform at least one function or operation performed by the electronic device 101 of FIG. 1. The server 410 may perform at least one function or operation performed by the server 106 of FIG. 1.

According to various embodiments, the transmitter 410 is a fixed or movable entity existing at a certain place and may periodically broadcast identification information (e.g., business information) irrelevant to the location information of the transmitter 410. The identification information may include a shop name, a business type, a business name, or a combination thereof. The transmitter 410 may broadcast, to at least one electronic device located within a short distance, the identification information corresponding to a place where the transmitter 410 is located. The transmitter 410 may broadcast the identification information (e.g., business information) to at least one electronic device that exists in a service area of the transmitter. Also, the transmitter 410 may broadcast a signal including its own identifier. The transmitter 410 may include various communication modules such as a Bluetooth module, a WiFi module, and a wireless network module.

According to various embodiments, the server 420 may receive, from the electronic device 101, the identification information (e.g., business information) and location information of the electronic device 101. The server 420 may receive the identification information transmitted to the electronic device 101 by the transmitter 410 and the location information acquired by the electronic device 101. Based on both the identification information and the location information which are received from the electronic device 101, the server 420 may determine a service suitable for a current location of the electronic device 101. In addition, the server 420 may provide information about the determined service to the electronic device 101. The service information may be varied depending on a business type, a business category, and a location of the electronic device. Based on the identification information (e.g., business information) and the location information both received from the electronic device 101, the server 420 may transmit at least one content corresponding to a shop name, a business type, a business category, a business name, or a combination thereof, as at least a part of the service information, to the electronic device 101.

According to various embodiments, the electronic device 101 may receive, from the transmitter 410 located within a short distance, the identification information (e.g., business information) corresponding to a place or area where the transmitter 410 is located. Then, the electronic device 101 may transmit the identification information and the location information to the server 420, receive the service information corresponding to the identification information from the server 420, and provide the service information to the user. The electronic device 101 may determine whether the remaining power amount of the battery 296 is smaller than a predetermined threshold value. If the remaining power amount is smaller than the predetermined threshold value, the electronic device 101 may not provide the service information to the user.

According to various embodiments, when the electronic device 101 enters (or moves into) a place or area where the transmitter 410 is located, the electronic device 101 may receive, from the transmitter 410, the identification information (e.g., business information) provided by a shop in the place or area where the transmitter 410 is located. The identification information (e.g., business information) may include a shop name, a business type, a business category, a business name, or a combination thereof, and may be varied depending on the location of the electronic device. The electronic device 101 may determine whether the identification information (e.g., business information) acquired from the transmitter 410 satisfies a specified condition. If the identification information acquired from the transmitter 410 satisfies the specified condition, the electronic device 101 may identify the location thereof by using at least one sensor equipped therein before transmitting the location information thereof to the server 420. Even when the Bluetooth module equipped in the electronic device 101 is in the OFF state, the electronic device 101 may scan a signal transmitted by the transmitter 410. Then, using the scanned signal, the electronic device 101 may identify the location thereof. The electronic device 101 may perform an operation corresponding to a unique user identifier (UUID) included in a data packet broadcasted by the transmitter 410 installed in a specific area. For example, if the same UUID is received from the transmitter 101, the electronic device 101 may perform the same operation regardless of the state of the user. In addition, even though the same UUID is received, the electronic device 101 may perform different operations by utilizing movement information of the user (e.g., walking or not, a walking state, a walking speed, the number of steps, etc.). The electronic device 101 may collect the movement information of the user in a background process and perform different operations by utilizing the movement information collected until the UUID is scanned. In addition, the electronic device 101 may provide different service information by using movement information and signal strength for a predetermined time (e.g., 5 seconds) after scanning the UUID. The electronic device 101 may determine whether the identification information (e.g., business information) includes a business type, a shop name, a business category, a business name, or a combination thereof associated with the electronic device. Alternatively, the electronic device 101 may determine whether the identification information (e.g., business information) includes a specified business type or a specified shop name in association with the electronic device. If the specified business type or the specified shop name is included in the identification information, the electronic device 101 may determine that a specified condition is satisfied.

According to various embodiments, the electronic device 101 may collect movement information thereof before receiving or acquiring the identification information (e.g., business information). Typically, the user carrying the electronic device 101 may move into a specific place or a store providing a service for business. In this case, using at least one sensor, the electronic device 101 may collect movement information about a moving path until the identification information (e.g., business information) is received. The movement information may include various kinds of information about movement such as walking or not, a walking state, a walking speed, and the number of steps. When a signal is received from the transmitter 410, the electronic device 101 may determine whether a movement to a place where the transmitter 410 is located occurs. The electronic device 101 may determine a movement path, distance, or direction of the user through the movement information collected until the signal is received. The electronic device 101 may identify a current location through the strength of the received signal. Based on the identification information (e.g., business information) and the collected location information, the electronic device 101 may determine whether the current location of the electronic device 101 is within a first area (e.g., 8 m to 10 m) apart from the transmitter 410 by a predetermined distance (e.g., 8 m), within a second area (e.g., 3 m to 8 m) apart from the transmitter 410 by another predetermined distance (e.g., 3 m), or within a third area (e.g., within 3 m) apart from the transmitter 410 by still another predetermined distance (e.g., 1 m). The electronic device 101 may transmit, to the server 420, the identification information (e.g., business information) and the location information corresponding to movement between the respective areas. The electronic device 101 may acquire the location information by periodically checking the movement of the electronic device 101 (or the walking of the user carrying the electronic device 101) between the first, second, and third areas, and then transmit the acquired location information together with the identification information (e.g., business information) to the server 420. The third area may be contained within and smaller than the second area, and the second area may be contained within and smaller than the first area. Each of the predetermined distances may be variably adjusted, and the first to third areas may also be variably adjusted. The electronic device 101 may transmit the identification information (e.g., business information) corresponding to each area to the server 420.

According to various embodiments, the electronic device 101 may calculate a distance to the transmitter 410 by analyzing the strength of the received signal. In addition, the electronic device 101 may perform a calibration in order to accurately calculate the distance. Generally, since signal interference may occur depending on surrounding radio waves and structures, the signal strength may not decrease in proportion to a distance. For example, if a structure interfering with radio waves exists between the transmitter 410 transmitting the signal and the electronic device 101, the electronic device 101 may detect lower signal strength than other electronic devices located at the same distance. Because an error may be caused depending on the surrounding environment in case of calculating the distance through the signal strength, the calibration may be performed to calculate the distance more accurately. The calibration may include a gesture of shaking the electronic device.

According to various embodiments, the electronic device 101 may transmit, to the server 420, the identification information (e.g., business information) received from the transmitter 410 and the acquired location information. The electronic device 101 may combine the identification information (e.g., business information) with the location information and transmit the combined information to the server 420. The electronic device 101 may combine periodically received identification information (e.g., business information) with the location information corresponding to the movement of the electronic device 101 and transmit the combined information to the server 420 periodically or at a user's request. The electronic device 101 may check the remaining amount of battery and, if the checked remaining amount is less than a predetermined value, not transmit the identification information (e.g., business information) and the location information to the server 420.

According to various embodiments, the electronic device 101 may receive service information corresponding to the identification information (e.g., business information) and the location information which have been transmitted to the server 420. The electronic device 101 may provide the service information, received from the server 420, to the user (e.g., display through the display, output audio through the speaker, output vibration, and the like). The electronic device 101 may receive, as at least a part of the service information, at least one piece of content corresponding to the identification information (e.g., business information) and the location information transmitted to the server 420. When the current location of the electronic device 101 is within the first area (e.g., 8 m to 10 m) apart from the transmitter 410 by a predetermined distance, the electronic device 101 may receive the service information corresponding to the first area from the transmitter 410 and then output the received service information through the display. When the current location of the electronic device 101 is within the second area (e.g., 3 m to 8 m) apart from the transmitter 410 by another predetermined distance, the electronic device 101 may receive the service information corresponding to the second area from the transmitter 410 and then output the received service information through the display. Also, when the current location of the electronic device 101 is within the third area (e.g., within 3 m) apart from the transmitter 410 by still another predetermined distance, the electronic device 101 may receive the service information corresponding to the second area from the transmitter 410 and then output the received service information through the display. For example, when the electronic device 101 is located in the first area, the electronic device 101 may receive a message related to a visit to a specific place (e.g., a welcome message, product sale information of the specific place, or discount information, etc.) from the server 420 and output it. When the electronic device 101 is located in the second area, the electronic device 101 may receive information corresponding to the place (e.g., information related to products arranged in the second area) from the server 420 and output it. When the electronic device 101 is located in the third area, the electronic device 101 may receive additional information provided in the place (e.g., coupon information, card discount information, etc.) from the server 420 and output it.

The electronic device 101 according to various embodiments of the present invention may include a communication module; a sensor; and a processor. The processor may be configured to acquire, by using the communication module, a signal from an external electronic device, the signal including one or more identification information corresponding to the external electronic device; to detect, by using the sensor, a movement of the electronic device; select first identification information of the at least one identification information when the movement satisfies a first condition; to select second identification information of the at least one identification information when the movement satisfies a second condition; and to provide service information corresponding to the selected first or second identification information.

According to an embodiment, the processor may be configured to acquire a distance to the external electronic device, based at least on the signal; and to determine, further based on the distance, whether the first condition or the second condition is satisfied.

According to an embodiment, the processor may be configured to perform a calibration to determine the distance, based at least on the movement.

According to an embodiment, the electronic device may further include a display, and the processor may be configured to provide the first or second identification information by using at least a portion of the display.

According to an embodiment, when the movement satisfying the first condition is changed to satisfy the second condition, the processor may be configured to stop providing the first service information (refraining from presenting) and to provide the second service information.

In addition, the electronic device 101 according to various embodiments of the present invention may include a first communication module, a second communication module, a memory configured to store location information of the electronic device, and a processor. The processor may be configured to acquire, from a first external electronic device located at a short distance from the electronic device, identification information corresponding to a place where the first external electronic device is located, by using the first communication module, to transmit the identification information and the location information to a second external electronic device by using the second communication module, and to receive service information corresponding to the identification information from the second external electronic device by using the second communication module.

According to an embodiment, the electronic device 101 may further include a display and may be configured to provide the service information by using the display.

According to an embodiment, the electronic device 101 may further include at least one sensor and may be configured to acquire the location information by using the sensor before transmitting the location information when the acquired identification information satisfies a specified condition.

According to an embodiment, the processor may be configured to determine whether the identification information includes a specified business type or specified shop name related to the electronic device, and to determine that the specified condition is satisfied, when the identification information includes the specified business type or specified shop name.

According to an embodiment, the identification information may include a shop name, a business type, a business name, or a combination thereof.

According to an embodiment, the processor may be configured to receive, as at least a part of the service information, at least one piece of content corresponding to the acquired identification information and the location information.

According to an embodiment, the processor may be configured to collect movement information of the electronic device before acquiring the identification information, to determine whether a movement to the place where the first external electronic device is located occurs when a signal is received from the first external electronic device, and to identify a current location of the electronic device by using the collected movement information and strength of the received signal.

According to an embodiment, the processor may be configured to calculate a distance to the first external electronic device by using the strength of the received signal, and to perform a calibration to accurately calculate the distance.

According to an embodiment, the processor may output service information corresponding to a first area through a display when the identified current location is within the first area apart from the first external electronic device by a first predetermined distance.

According to an embodiment, the processor may output service information corresponding to a second area through the display when the identified current location is within the second area apart from the first external electronic device by a second predetermined distance.

According to an embodiment, the processor may output service information corresponding to a third area through the display when the identified current location is within the third area apart from the first external electronic device by a third predetermined distance.

According to an embodiment, the third area may be contained within and smaller than the second area, and the second area may be contained within and smaller than the first area.

According to an embodiment, the processor may be configured to output the service information corresponding to a movement between the respective areas through the display.

According to an embodiment, the processor may be configured to acquire the location information by periodically detecting a movement of the electronic device in the first area, the second area, or the third area, to transmit the acquired location information and the acquired identification information to the second external electronic device, and to receive service information corresponding to the detected movement from the second external electronic device to provide the received service information through the display.

According to an embodiment, the service information corresponding to the first area may include a welcome message for a visit to the place, the service information corresponding to the second area may includes information corresponding to the place, and the service information corresponding to the third area may include additional information provided at the place.

According to an embodiment, the processor may be configured to check a remaining power amount of a battery of the electronic device, and configured not to provide the received service information when the remaining power amount is smaller than a predetermined value.

Figure 5:
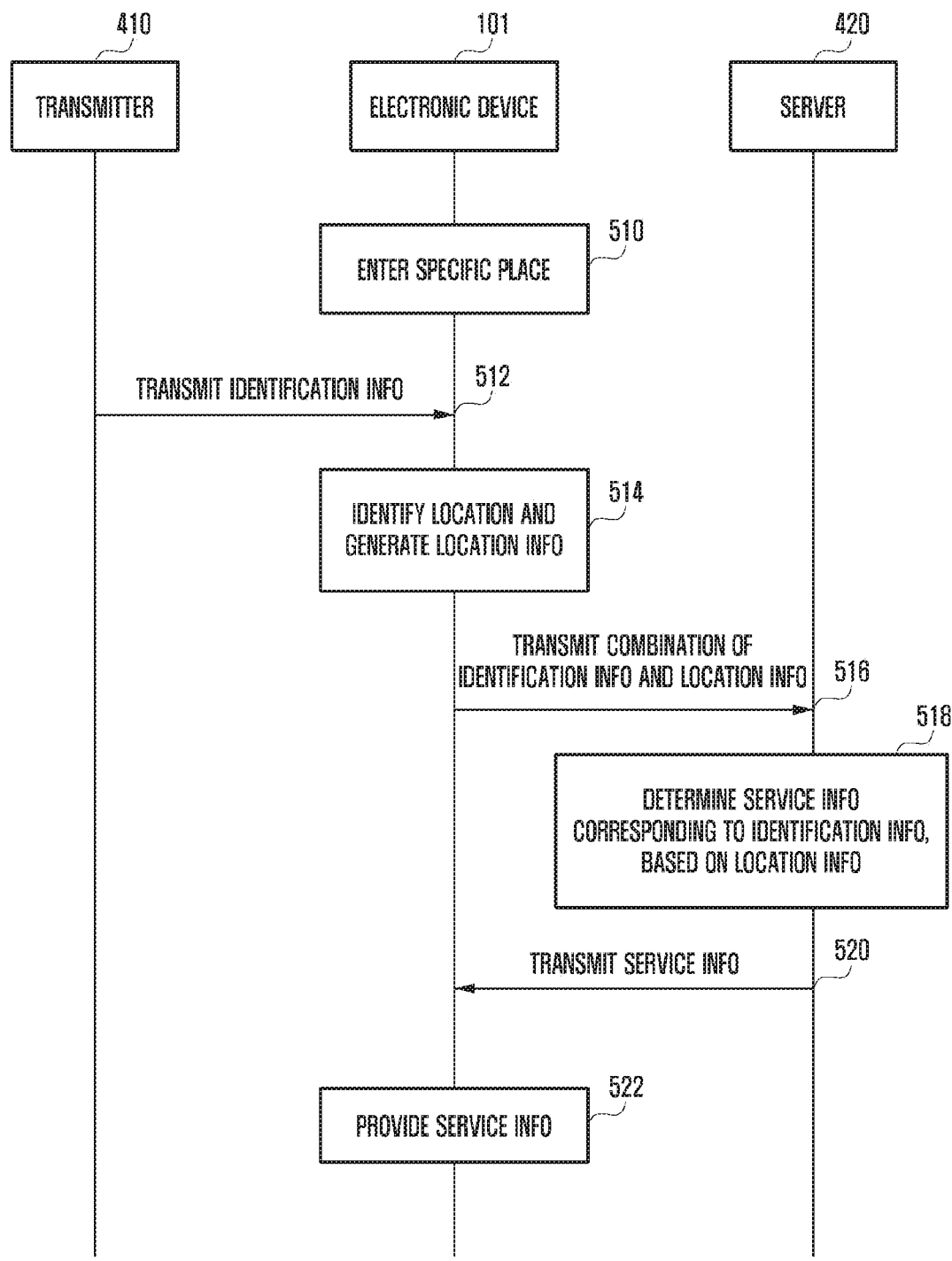
FIG. 5 is a diagram illustrating a process in a system for providing service information according to an embodiment of the present invention.

FIG. 5 is a diagram illustrating a process in a system for providing service information according to an embodiment of the present invention.

Hereinafter, a process in a system for providing service information according to an embodiment of the present invention will be described in detail with reference to FIG. 5.

The system according to an embodiment of the present invention includes the transmitter 410, the electronic device 101, and the server 420. This is, however, exemplary only, and a repeater (not shown) for relaying a signal or data transmitted/received between the above entities may be further included.

According to various embodiments, the electronic device 101 may detect an entry into a specific place (step 510). When the user carrying the electronic device 101 moves, the electronic device 101 may periodically check or calculate a moving direction, a moving speed, a moving distance, or the like. When the user moves, the electronic device 101 may determine, in response to detection of a signal received from an external electronic device (e.g., the transmitter 410), that the user is entering a place or area where the transmitter 410 is located. The electronic device 101 may detect the signal transmitted by the transmitter 410 through at least one communication module included therein and, through this detection, may determine that the user is entering the place or area where the transmitter 410 is located.

According to various embodiments, when it is detected that the electronic device 101 is entering a specific place, the transmitter 410 may transmit identification information (e.g., business information) to the electronic device 101 (step 512). The transmitter 410 may reside in a shop located in a building and periodically broadcast a signal (e.g., a beacon signal, including a unique user identifier (UUID)). The transmitter 410 is a fixed or movable entity existing at a certain place and may periodically broadcast business information irrelevant to location information of the transmitter 410. The identification information may include a shop name, a business type, a business name, or a combination thereof. The transmitter 410 may broadcast the identification information to at least one electronic device existing in a service area thereof. In addition, the transmitter 410 may broadcast a signal including its own identifier. The transmitter 410 may transmit the identification information to the electronic device 101 through various communication modules such as a Bluetooth module, a WiFi module, and a wireless network module.

According to various embodiments, the electronic device 101 may identify a location thereof and generate location information (step 514). Also, the electronic device 101 may combine the identification information with the location information and transmit the combined information to the server 420 (step 516). The electronic device 101 may collect movement information thereof before receiving or acquiring the identification information. Typically, the user carrying the electronic device 101 may move into a specific place or a store (or a shop, a theater, etc.) providing a service for business. In this case, the electronic device 101 may collect movement information about a moving path until the identification information is received. When a signal is received from the transmitter 410, the electronic device 101 may determine whether a movement to a place where the transmitter 410 is located occurs. The electronic device 101 may determine a movement path, distance, or direction of the user through the movement information collected until the signal is received. The electronic device 101 may identify a current location through the strength of the received signal. The electronic device 101 may use a separate low-power processor to reduce power consumption due to a sensing operation of identifying the current location. For example, when the amount of power consumed to identify the current location exceeds a predetermined threshold value, the electronic device 101 may change an operation mode thereof to a low-power mode and then identify the current location in the low-power mode. Based at least on the identification information (e.g., business information) and the collected location information, the electronic device 101 may determine whether the current location of the electronic device 101 is within a first area (e.g., 8 m to 10 m) apart from the transmitter 410 by a predetermined distance (e.g., 8 m), within a second area (e.g., 3 m to 8 m) apart from the transmitter 410 by another predetermined distance (e.g., 3 m), or within a third area (e.g., within 3 m) apart from the transmitter 410 by still another predetermined distance (e.g., 1 m). The electronic device 101 may transmit, to the server 420, the identification information and the location information corresponding to movement between the respective areas. The electronic device 101 may acquire the location information by periodically checking the movement of the electronic device 101 (or the walking of the user carrying the electronic device 101) between the first, second, and third areas, and then transmit the acquired location information together with the identification information to the server 420.

According to various embodiments, using the location information and identification information (e.g., business information) received from the electronic device 101, the server 420 may determine service information to be provided to the electronic device 101 (step 518), and then transmit the determined service information to the electronic device 101 (step 520). The server 420 may determine the service information corresponding to the identification information, based on the location information, and transmit the determined service information to the electronic device 101.

According to various embodiments, the server 420 may receive, from the electronic device 101, the identification information (e.g., business information) and location information of the electronic device 101. The server 420 may receive the identification information transmitted to the electronic device 101 by the transmitter 410 and the location information acquired by the electronic device 101. Based on both the identification information and the location information which are received from the electronic device 101, the server 420 may determine a service suitable for the current location of the electronic device 101. In addition, the server 420 may provide information about the determined service to the electronic device 101. The service information may be varied depending on a business type, a business category, and a location of the electronic device. Based on the identification information and the location information both received from the electronic device 101, the server 420 may transmit at least one content corresponding to a shop name, a business type, a business category, a business name, or a combination thereof, as at least a part of the service information, to the electronic device 101. For example, when the electronic device 101 is located in the first area, the server 420 may transmit a message related to a visit to a specific place (e.g., a welcome message, product sale information of the specific place, or discount information, etc.) to the electronic device 101. When the electronic device 101 is located in the second area, the server 420 may transmit information corresponding to a shop located in the specific place to the electronic device 101. This information may include information (e.g., price, time, etc.) about various products (e.g., menu, kind, etc.) provided by the shop. In addition, this information may include various kinds of information depending on a type or category of the shop or service business, and the like. When the electronic device 101 is located in the third area, the server 420 may transmit additional information (e.g., a membership card, a discount card, a coupon, etc.) to the electronic device 101. For example, if the user having the electronic device 101 moves in a state where such service information is provided, the electronic device 101 may transmit, to the server 420, location information changed by such movement, and then the server 420 may transmit, to the electronic device 101, service information determined based on the received location information.

According to various embodiments, the electronic device 101 may provide the service information, received from the server 420, to the user (step 522). The electronic device 101 may output, in various manners such as voice, vibration, or pop-up, various kinds of service information received from the server 420 so that the user can recognize such service information. The electronic device 101 may receive the service information corresponding to the identification information and the location information both transmitted to the server 420. The electronic device 101 may provide the service information, received from the server 420, to the user (e.g., display through the display, output audio through the speaker, output vibration, and the like). The electronic device 101 may receive, as at least a part of the service information, at least one piece of content corresponding to the identification information and the location information transmitted to the server 420. The electronic device 101 may provide different kinds of information to the user, based on a distance between the transmitter 410 and the electronic device 101. When the service information is received from the server 420, the electronic device 101 may provide different kinds of information to the user on the basis of the distance. For example, when the current location of the electronic device 101 is within the first area (e.g., 8 m to 10 m) apart from the transmitter 410 by a predetermined distance, the electronic device 101 may receive the service information corresponding to the first area from the transmitter 410 and then output the received service information through the display. For example, when the current location of the electronic device 101 is within the second area (e.g., 3 m to 8 m) apart from the transmitter 410 by another predetermined distance, the electronic device 101 may receive the service information corresponding to the second area from the transmitter 410 and then output the received service information through the display. Also, when the current location of the electronic device 101 is within the third area (e.g., within 3 m) apart from the transmitter 410 by still another predetermined distance, the electronic device 101 may receive the service information corresponding to the second area from the transmitter 410 and then output the received service information through the display. For example, when the electronic device 101 is located in the first area, the electronic device 101 may receive a message related to a visit to a specific place (e.g., a welcome message, product sale information of the specific place, or discount information, etc.) from the server 420 and output it. This message may include various messages that welcome the user to a specific place. When the electronic device 101 is located in the second area, the electronic device 101 may receive information corresponding to the place from the server 420 and output it. This information may include information (e.g., price, time, etc.) about various products (e.g., menu, kind, etc.) provided by the shop. In addition, this information may include various kinds of information depending on a type or category of the shop or service business, and the like. When the electronic device 101 is located in the third area, the electronic device 101 may receive additional information provided in the place from the server 420 and output it. The additional information may include various kinds of information for reducing a cost of the user, such as a membership card, a discount card, a coupon, or an event, or information about various benefits providable to the user. The electronic device 101 may determine whether the remaining power amount of the battery 296 is smaller than a predetermined threshold value. If the remaining power amount is smaller than the predetermined threshold value, the electronic device 101 may not provide the service information to the user.

In addition, the electronic device 101 may acquire, from an external electronic device (e.g., the transmitter 410) through the communication module 220, a signal including one or more identification information corresponding to the external electronic device, and detect a movement of the electronic device 101 by using at least one sensor equipped in the sensor module 240. In addition, if the detected movement satisfies a first condition, the electronic device 101 may select first identification information of the at least one identification information. If the detected movement satisfies a second condition, the electronic device 101 may select second identification information of the at least one identification information. The electronic device 101 may provide service information corresponding to the selected first or second identification information to the user. The electronic device 101 may acquire a distance to the external electronic device, based at least on the acquired signal, and determine, further based on the distance, whether the first condition or the second condition is satisfied. The electronic device 101 may perform a calibration to determine the distance, based at least on the detected movement. The electronic device 101 may further include the display 160, and the electronic device 101 may provide the first or second identification information by using at least a portion of the display. When the movement satisfying the first condition is changed to satisfy the second condition, the electronic device 101 may stop providing the first service information (refraining from presenting) and provide the second service information.

Figure 6:
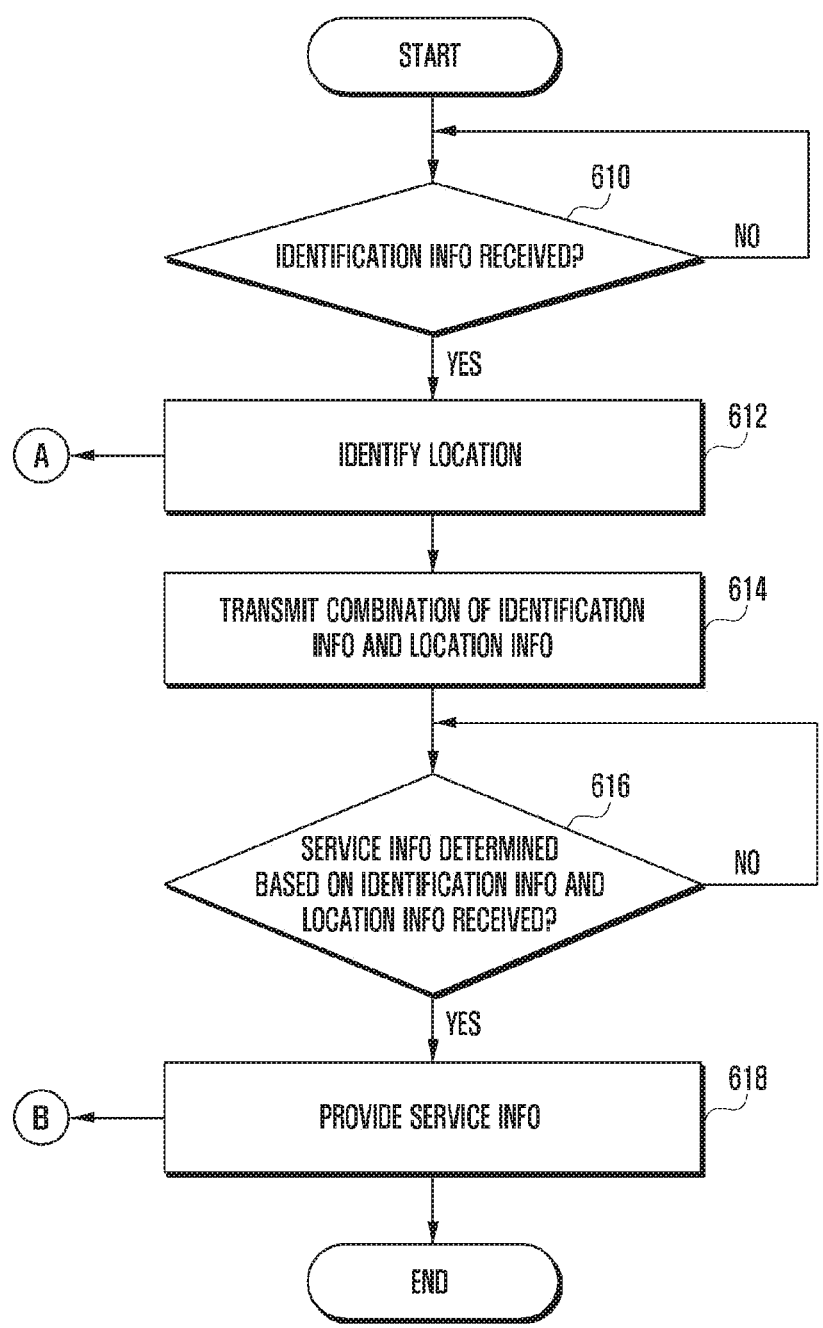
FIG. 6 is a flow diagram illustrating a process of providing service information in an electronic device according to various embodiments of the present invention.

FIG. 6 is a flow diagram illustrating a process of providing service information in an electronic device according to various embodiments of the present invention.

Hereinafter, a process of providing service information in an electronic device according to various embodiments of the present invention will be described in detail with reference to FIG. 6.

When identification information (e.g., business information) is received (step 610), the electronic device 101 (e.g., the processor 120) may identify the location (step 612).

According to various embodiments, the electronic device 101 (e.g., the processor 120) may periodically receive business information irrelevant to location information of the transmitter 410. The identification information may include a shop name, a business type, a business name, or a combination thereof. In addition, the electronic device 101 (e.g., the processor 120) may receive a signal including an identifier of the transmitter 410. The electronic device 101 may receive the identification information through various communication modules such as a Bluetooth module, a WiFi module, and a wireless network module.

According to various embodiments, the electronic device 101 (e.g., the processor 120) may collect movement information thereof before receiving or acquiring the identification information. Typically, the user carrying the electronic device 101 may move into a specific place or a store (or a shop, a theater, etc.) providing a service for business. In this case, the electronic device 101 (e.g., the processor 120) may collect walking information about a moving path until the identification information is received. When a signal is received from the transmitter 410, the electronic device 101 (e.g., the processor 120) may determine whether a movement to a place where the transmitter 410 is located occurs. The electronic device 101 may use a separate low-power processor to reduce power consumption due to a sensing operation of determining whether the movement occurs. For example, when the amount of power consumed to identify the occurrence of movement exceeds a predetermined threshold value, the electronic device 101 may change an operation mode thereof to a low-power mode and then identify the occurrence of movement in the low-power mode. The electronic device 101 (e.g., the processor 120) may determine a movement path, distance, or direction of the user through the walking information collected until the signal is received. The electronic device 101 (e.g., the processor 120) may identify a current location through the strength of the signal received from the transmitter 410. Based at least on the identification information and the collected location information, the electronic device 101 (e.g., the processor 120) may determine whether the current location of the electronic device 101 is within a first area (e.g., 8 m to 10 m) apart from the transmitter 410 by a predetermined distance (e.g., 8 m), within a second area (e.g., 3 m to 8 m) apart from the transmitter 410 by another predetermined distance (e.g., 3 m), or within a third area (e.g., within 3 m) apart from the transmitter 410 by still another predetermined distance (e.g., 1 m). Determining the location of the electronic device 101 (e.g., the processor 120) will be described in detail with reference to FIG. 7.

According to various embodiments, the electronic device 101 (e.g., the processor 120) may combine the location information with the identification information (e.g., business information) and then transmit the combined information (step 614). The electronic device 101 (e.g., the processor 120) may transmit, to the server 420, a combination of the identification information and the location information corresponding to movement between the respective areas. The electronic device 101 may acquire the location information by periodically checking the movement of the electronic device 101 (or the walking of the user carrying the electronic device 101) between the first, second, and third areas, combine the acquired location information with the identification information, and transmit the combined information to the server 420.

According to various embodiments, when the service information determined through the identification information based on the location information is received (step 616), the electronic device 101 (e.g., the processor 120) may provide the service information (step 618). The electronic device 101 (e.g., the processor 120) may receive, from the server 420, the service information determined based on the identification information and the location information of the electronic device 101. The electronic device 101 (e.g., the processor 120) may receive the service information suitable for the current location of the electronic device 101 and determined by the server 420. The service information may be varied depending on a business type, a business category, and a location of the electronic device. Based on the identification information and the location information, the electronic device 101 (e.g., the processor 120) may receive at least one content corresponding to a shop name, a business type, a business category, a business name, or a combination thereof, as at least a part of the service information, from the server 420. For example, when the electronic device 101 is located in the first area, the electronic device 101 (e.g., the processor 120) may receive a message related to a visit to a specific place (e.g., a welcome message, product sale information of the specific place, or discount information, etc.) from the server 420. When the electronic device 101 is located in the second area, the electronic device 101 (e.g., the processor 120) may receive information corresponding to a shop located in the specific place from the server 420. This information may include information (e.g., price, time, etc.) about various products (e.g., menu, kind, etc.) provided by the shop. In addition, this information may include various kinds of information depending on a type or category of the shop or service business, and the like. When the electronic device 101 is located in the third area, the electronic device 101 (e.g., the processor 120) may receive additional information (e.g., a membership card, a discount card, a coupon, etc.) from the server 420. For example, if the user having the electronic device 101 moves in a state where such service information is provided, the electronic device 101 (e.g., the processor 120) may transmit, to the server 420, location information changed by such movement, and then receive, from the server 420, service information determined based on the transmitted location information.

According to various embodiments, the electronic device 101 (e.g., the processor 120) may provide the service information, received from the server 420, to the user. The electronic device 101 (e.g., the processor 120) may output, in various manners such as voice, vibration, or pop-up, various kinds of service information received from the server 420 so that the user can recognize such service information. The electronic device 101 (e.g., the processor 120) may receive the service information corresponding to the identification information and the location information both transmitted to the server 420. The electronic device 101 (e.g., the processor 120) may provide the service information, received from the server 420, to the user (e.g., display through the display, output audio through the speaker, output vibration, and the like). The electronic device 101 (e.g., the processor 120) may receive, as at least a part of the service information, at least one piece of content corresponding to the identification information and the location information transmitted to the server 420, and then provide the received content to the user. The electronic device 101 may provide different kinds of information to the user, based on a distance between the transmitter 410 and the electronic device 101. When the service information is received from the server 420, the electronic device 101 may provide different kinds of information to the user on the basis of the distance. For example, when the current location of the electronic device 101 is within the first area (e.g., 8 m to 10 m) apart from the transmitter 410 by a predetermined distance, the electronic device 101 may receive the service information corresponding to the first area from the transmitter 410 and then output the received service information through the display. For example, when the current location of the electronic device 101 is within the second area (e.g., 3 m to 8 m) apart from the transmitter 410 by another predetermined distance, the electronic device 101 may receive the service information corresponding to the second area from the transmitter 410 and then output the received service information through the display. Also, when the current location of the electronic device 101 is within the third area (e.g., within 3 m) apart from the transmitter 410 by still another predetermined distance, the electronic device 101 may receive the service information corresponding to the second area from the transmitter 410 and then output the received service information through the display. For example, when the electronic device 101 is located in the first area, the electronic device 101 (e.g., the processor 120) may receive a message related to a visit to a specific place (e.g., a welcome message, product sale information of the specific place, or discount information, etc.) from the server 420 and output it. This message may include various messages that welcome the user to a specific place. When the electronic device 101 is located in the second area, the electronic device 101 (e.g., the processor 120) may receive information corresponding to the place from the server 420 and output it. This information may include information (e.g., price, time, etc.) about various products (e.g., menu, kind, etc.) provided by the shop. In addition, this information may include various kinds of information depending on a type or category of the shop or service business, and the like. When the electronic device 101 is located in the third area, the electronic device 101 (e.g., the processor 120) may receive additional information (e.g., coupon information, card discount information, etc.) provided in the place from the server 420 and output it. The additional information may include various kinds of information for reducing a cost of the user, such as a membership card, a discount card, a coupon, or an event, or information about various benefits providable to the user. In addition, the electronic device 101 may determine whether the remaining power amount of the battery 296 is smaller than a predetermined threshold value. If the remaining power amount is smaller than the predetermined threshold value, the electronic device 101 may not provide the service information to the user. This service provision of the electronic device 101 will be described in detail with reference to FIG. 8.

In addition, the electronic device 101 may acquire, from an external electronic device (e.g., the transmitter 410) through the communication module 220, a signal including one or more identification information corresponding to the external electronic device, and detect a movement of the electronic device 101 by using at least one sensor equipped in the sensor module 240. In addition, if the detected movement satisfies a first condition, the electronic device 101 may select first identification information of the at least one identification information. If the detected movement satisfies a second condition, the electronic device 101 may select second identification information of the at least one identification information. The electronic device 101 may provide service information corresponding to the selected first or second identification information to the user. The electronic device 101 may acquire a distance to the external electronic device, based at least on the acquired signal, and determine, further based on the distance, whether the first condition or the second condition is satisfied. The electronic device 101 may perform a calibration to determine the distance, based at least on the detected movement. The electronic device 101 may further include the display 160, and the electronic device 101 may provide the first or second identification information by using at least a portion of the display. When the movement satisfying the first condition is changed to satisfy the second condition, the electronic device 101 may stop providing the first service information (refraining from presenting) and provide the second service information.

Furthermore, for example, when the electronic device 101 is a smart car, the electronic device 101 may receive GPS signals and thereby determine a moving state of the electronic device 101. For example, based on at least a part of the received GPS signals, the electronic device 101 may determine whether a moving vehicle exists on a highway, on a national road, or on a downtown road. Then, the electronic device 101 may differently select the identification information according to such various situations.

A method for providing service information in the electronic device 101 according to various embodiments of the present invention may include an operation of acquiring, by using a communication module, a signal from an external electronic device, the signal including one or more identification information corresponding to the external electronic device, an operation of detecting, by using a sensor, a movement of the electronic device, an operation of selecting first identification information of the at least one identification information when the movement satisfies a first condition, an operation of selecting second identification information of the at least one identification information when the movement satisfies a second condition, and an operation of providing service information corresponding to the selected first or second identification information.

According to an embodiment, the method may further include an operation of acquiring a distance to the external electronic device, based at least on the signal, and an operation of determining, further based on the distance, whether the first condition or the second condition is satisfied.

According to an embodiment, the method may further include an operation of performing a calibration to determine the distance, based at least on the movement.

According to an embodiment, when the movement satisfying the first condition is changed to satisfy the second condition, the method may stop providing the first service information (refraining from presenting) and provide the second service information.

In addition, a method for providing service information in the electronic device 101 according to various embodiments of the present invention may include operations of acquiring, from a first external electronic device located at a short distance from the electronic device, identification information corresponding to a place where the first external electronic device is located, transmitting the identification information and location information of the electronic device to a second external electronic device, and receiving service information corresponding to the identification information from the second external electronic device.

According to an embodiment, the method may further include operation of providing the service information by using the display.

According to an embodiment, the method may further include operation of acquiring the location information by using at least one sensor equipped in the electronic device before transmitting the location information when the acquired identification information satisfies a specified condition.

According to an embodiment, the operation of acquiring the location information may include operations of determining whether the acquired identification information includes a specified business type or specified shop name related to the electronic device, and determining that the specified condition is satisfied, when the identification information includes the specified business type or specified shop name.

According to an embodiment, the operation of receiving the service information may include operation of receiving, as at least a part of the service information, at least one piece of content corresponding to the acquired identification information and the location information.

According to an embodiment, the method may further include operations of collecting movement information of the electronic device before acquiring the identification information, determining whether a movement to the place where the first external electronic device is located occurs when a signal is received from the first external electronic device, and identifying a current location of the electronic device by using the collected movement information and strength of the received signal.

According to an embodiment, the operation of identifying the current location may include operations of calculating a distance to the first external electronic device by using the strength of the received signal, and performing a calibration to accurately calculate the distance.

According to an embodiment, the operation of receiving the service information may include operation of outputting service information corresponding to a first area through a display when the identified current location is within the first area apart from the first external electronic device by a first predetermined distance.

According to an embodiment, the operation of receiving the service information may include operation of outputting service information corresponding to a second area through the display when the identified current location is within the second area apart from the first external electronic device by a second predetermined distance.

According to an embodiment, the operation of receiving the service information may include operation of outputting service information corresponding to a third area through the display when the identified current location is within the third area apart from the first external electronic device by a third predetermined distance.

According to an embodiment, the third area may be contained within and smaller than the second area, and the second area may be contained within and smaller than the first area.

According to an embodiment, the operation of receiving the service information may include operation of outputting the service information corresponding to a movement between the respective areas through the display.

According to an embodiment, the current location may be acquired by periodically detecting a movement of the electronic device in the first area, the second area, or the third area.

According to an embodiment, the method may further include operations of checking a remaining power amount of a battery of the electronic device, and not providing the received service information when the remaining power amount is smaller than a predetermined value.

Figure 7:
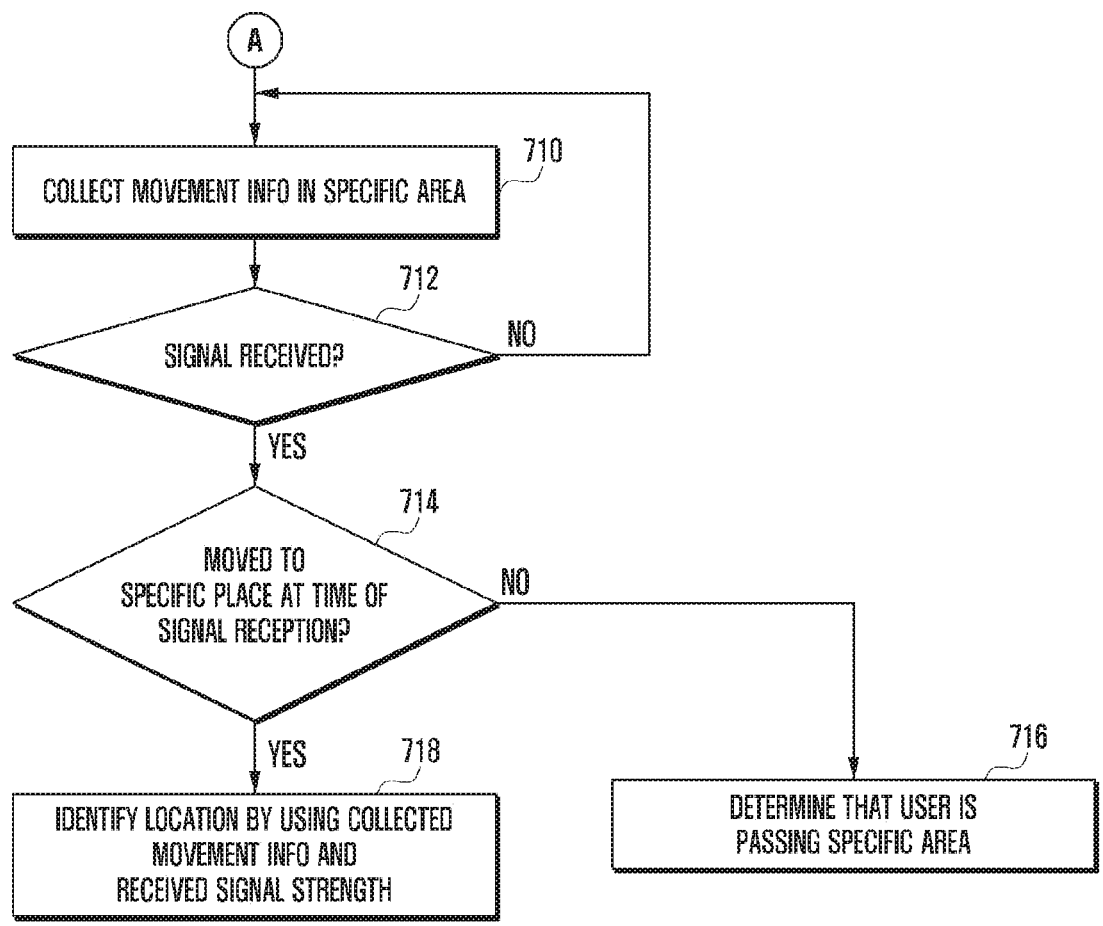
FIG. 7 is a flow diagram illustrating a process of identifying a location of an electronic device according to various embodiments of the present invention.

FIG. 7 is a flow diagram illustrating a process of identifying a location of an electronic device according to various embodiments of the present invention.

Hereinafter, a process of identifying a location of an electronic device according to various embodiments of the present invention will be described in detail with reference to FIG. 7.

According to various embodiments, the electronic device 101 may collect movement information in a specific area (step 710). The electronic device 101 (e.g., the processor 120) may collect location information thereof changed by movement (e.g., walking, running, etc.) before or even after the identification information (e.g., business information) is received from the transmitter 410. The electronic device 101 (e.g., the processor 120) may collect movement information thereof before receiving or acquiring the identification information. Typically, the user carrying the electronic device 101 may move into a specific place or a store providing a service for business. In this case, by using at least one sensor, the electronic device 101 (e.g., the processor 120) may collect walking information about a moving path until the identification information is received.

According to various embodiments, when a signal is received from the transmitter 410 (step 712), the electronic device 101 (e.g., the processor 120) may determined whether the electronic device 101 moves to a specific place at the time of receiving the signal (step 714). The transmitter 410 may broadcast the identification information (e.g., business information) to at least one electronic device existing in a service area thereof. In addition, the transmitter 410 may broadcast a signal including its own identifier. The transmitter 410 may broadcast the identification information or a signal including its own identifier (e.g., UUID) through various communication modules such as a Bluetooth module, a WiFi module, and a wireless network module. The electronic device 101 (e.g., the processor 120) may receive the identification information or the signal from the transmitter 410. When the signal is received from the transmitter 410, the electronic device 101 (e.g., the processor 120) may determine whether a movement to a place where the transmitter 410 is located occurs. The electronic device 101 (e.g., the processor 120) may determine a movement path, distance, or direction of the user through walking information collected until the signal is received.

According to various embodiments, if it is determined at step 714 that no movement to a specific place occurs, the electronic device 101 (e.g., the processor 120) may determine that the user passes a specific area (step 716). After the signal is received, the electronic device 101 (e.g., the processor 120) may determine the moving direction of the user by measuring the strength of the signal. If the signal strength is gradually weakened, the electronic device 101 (e.g., the processor 120) may determine that the user is moving away from the specific area. After the signal is received, the electronic device 101 (e.g., the processor 120) may acquire various kinds of information about movement, such as walking or not, a walking state, a walking speed, and the number of steps, through at least one sensor, and may perform various analyzes on the movement through the acquired information.

According to various embodiments, if it is determined at step 714 that the movement to a specific place occurs, the electronic device 101 (e.g., the processor 120) may identify the location thereof by using the collected movement information and the strength of the received signal (step 718). Based on the identification information and the collected location information, the electronic device 101 (e.g., the processor 120) may determine whether the current location of the electronic device 101 is within a first area (e.g., 8 m to 10 m) apart from the transmitter 410 by a predetermined distance (e.g., 8 m), within a second area (e.g., 3 m to 8 m) apart from the transmitter 410 by another predetermined distance (e.g., 3 m), or within a third area (e.g., within 3 m) apart from the transmitter 410 by still another predetermined distance (e.g., 1 m). The electronic device 101 (e.g., the processor 120) may calculate a distance to the transmitter 410 by analyzing the strength of the received signal. In addition, the electronic device 101 (e.g., the processor 120) may perform a calibration in order to accurately calculate the distance. Because an error may be caused depending on the surrounding environment in case of calculating the distance through the signal strength, the calibration may be performed to calculate the distance more accurately. Using the collected movement information, the strength of the received signal, or the calibration, the electronic device 101 (e.g., the processor 120) may determine a particular place in a specific area where the electronic device 101 is currently located. As described above, when the location of the electronic device 101 is identified, the electronic device 101 (e.g., the processor 120) may combine the identified location information with the identification information and transmit the combined information to the server 420.

Figure 8:
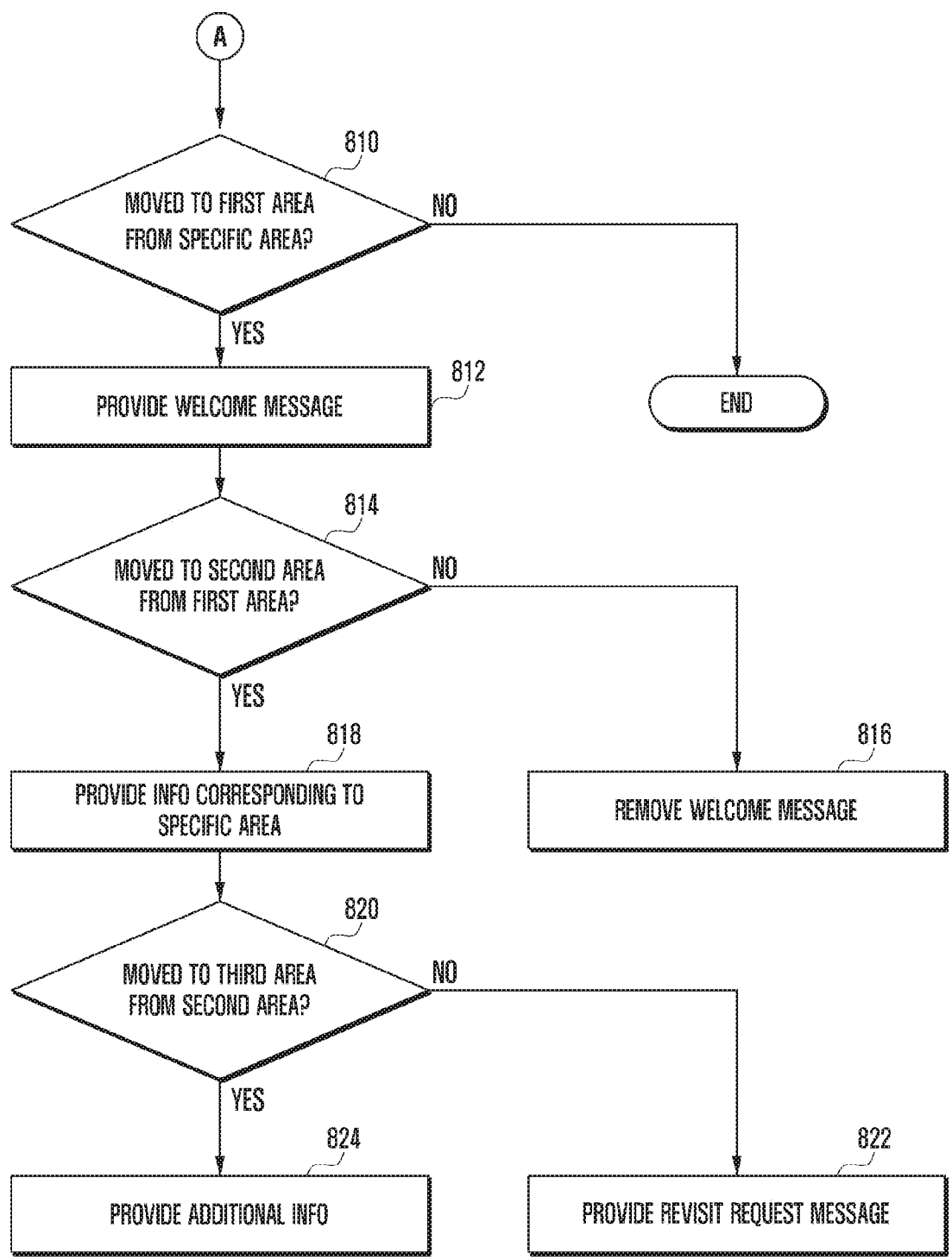
FIG. 8 is a flow diagram illustrating a process of providing service information in an electronic device according to various embodiments of the present invention.

FIG. 8 is a flow diagram illustrating a process of providing service information in an electronic device according to various embodiments of the present invention.

Hereinafter, a process of providing service information in an electronic device according to various embodiments of the present invention will be described in detail with reference to FIG. 8.

According to various embodiments, when there is a movement from a specific area to a first area (step 810), the electronic device 101 (e.g., the processor 120) may provide a message (step 812). Through the movement information collected in the specific area, the electronic device 101 (e.g., the processor 120) may determine whether the electronic device 101 is moving out of the specific area or moving within the specific area. The electronic device 101 (e.g., the processor 120) may determine the moving direction and speed thereof by collecting the movement information thereof from the specific area for a predetermined time. If it is determined that the electronic device 101 stays in the specific area for a predetermined time, the electronic device 101 (e.g., the processor 120) may generate a message and output it via the display 160. Alternatively, the electronic device 101 (e.g., the processor 120) may provide a welcome message to the user via voice or vibration. This message may include various messages that welcome the user to a specific place. Also, this message may include a message related to a visit to a specific place (e.g., a welcome message, product sale information of the specific place, or discount information, etc.).

According to various embodiments, if there is no movement from the first area to the second area (step 814), the electronic device 101 (e.g., the processor 120) may remove the provided message (step 816). The electronic device 101 (e.g., the processor 120) may calculate a time for which the electronic device 101 stays in the first area. If the electronic device 101 does not move to the second area within a predetermined time or is moving out of the first area, the electronic device 101 (e.g., the processor 120) may remove the provided message. Alternatively, the electronic device 101 (e.g., the processor 120) may generate and output a notification message to induce a revisit.

According to various embodiments, when there is a movement from the first area to the second area (step 814), the electronic device 101 (e.g., the processor 120) may provide information corresponding to the specific place (step 818). The electronic device 101 (e.g., the processor 120) may calculate a time for which the electronic device 101 stays in the first area. When the electronic device 101 moves to the second area within a predetermined time, the electronic device 101 (e.g., the processor 120) may provide information corresponding to the specific place. Alternatively, the electronic device 101 (e.g., the processor 120) may generate and output a notification message to induce a revisit. This information may include information (e.g., price, time, etc.) about various products (e.g., menu, kind, etc.) provided in the specific place. In addition, this information may include various kinds of information depending on a type or category of the shop or service business, and the like.

According to various embodiments, if there is no movement from the second area to the third area (step 820), the electronic device 101 (e.g., the processor 120) may provide a revisit request message (step 822). The electronic device 101 (e.g., the processor 120) may calculate a time for which the electronic device 101 stays in the second area. If the electronic device 101 does not move to the third area within a predetermined time or is moving out of the second area, the electronic device 101 (e.g., the processor 120) may generate and output the revisit request message. Alternatively, if the electronic device 101 does not move to the third area within a predetermined time or is moving out of the second area, the electronic device 101 (e.g., the processor 120) may determine that the user has intention of purchasing a product sold in a specific place, and then generate and output a notification message to induce a revisit.

According to various embodiments, when there is a movement from the second area to the third area (step 820), the electronic device 101 (e.g., the processor 120) may provide additional information (step 824). The electronic device 101 (e.g., the processor 120) may calculate a time for which the electronic device 101 stays in the second area. When the electronic device 101 moves to the third area within a predetermined time, the electronic device 101 (e.g., the processor 120) may provide additional information or coupon notification provided in the specific place. Also, if it is determined that the electronic device 101 stays in the third area for a predetermined time or more, the electronic device 101 (e.g., the processor 120) may provide additional information by determining that the user purchases a product sold in a specific place. The additional information may include various kinds of information for reducing a cost of the user, such as a membership card, a discount card, a coupon, or an event, or information about various benefits providable to the user. In addition, the additional information may include various kinds of information depending on a type or category of the shop or service business, and the like.

Figure 9:
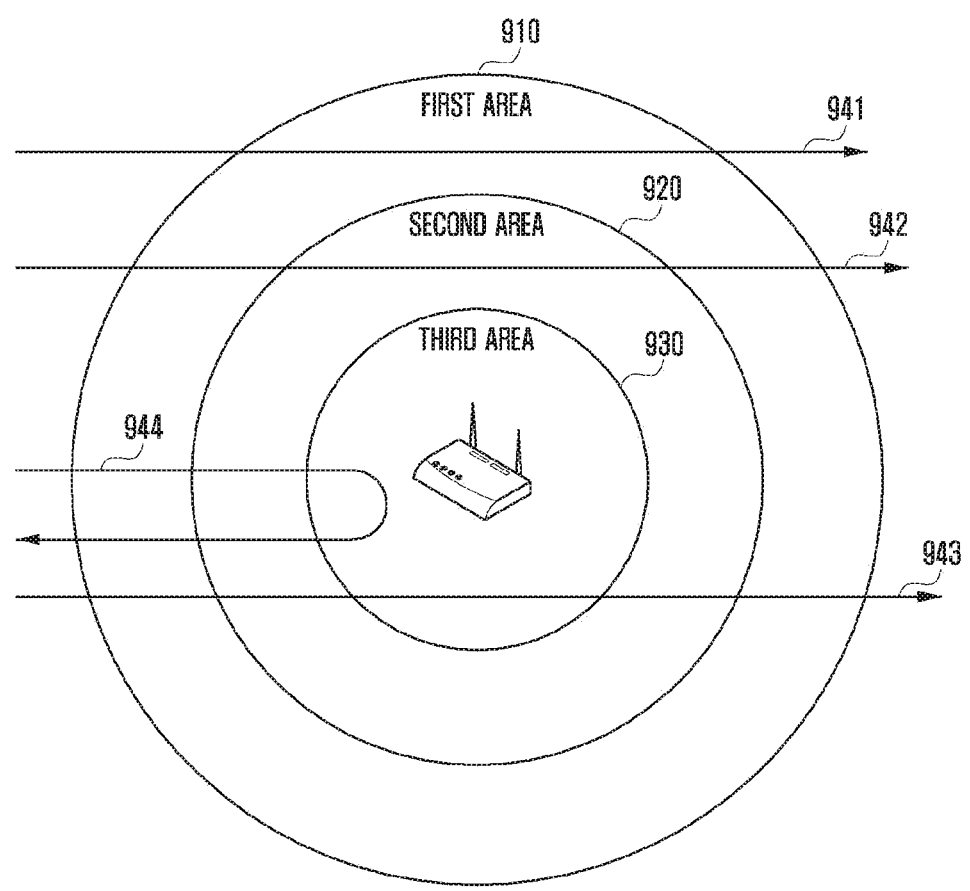
FIG. 9 is an exemplary diagram illustrating a movement path of an electronic device according to various embodiments of the present invention.

FIG. 9 is an exemplary diagram illustrating a movement path of an electronic device according to various embodiments of the present invention.

Referring to FIG. 9, a specific area for providing service information may be divided into a first area 910, a second area 920, and a third area 930, based on the transmitter 410.

According to various embodiments, based on the identification information (e.g., business information) and the collected location information, the electronic device 101 (e.g., the processor 120) may determine whether the current location of the electronic device 101 exists within the first area 910 apart from the transmitter 410 by a predetermined distance, within the second area 920 apart from the transmitter 410 by another predetermined distance, or within the third area 930 apart from the transmitter 410 by still another predetermined distance. Alternatively, based on the identification information and the collected location information, the electronic device 101 (e.g., the processor 120) may determine whether the electronic device 101 enters the first area 910 and then moves out of the first area 910 (movement 941). This case may include a case in which the user passes a specific area. When the electronic device 101 enters the first area 910, the electronic device 101 (e.g., the processor 120) may provide a message. If it is determined that the electronic device 101 is staying in the first area 910 for a predetermined time, the electronic device 101 (e.g., the processor 120) may generate a message and output it via the display 160. The electronic device 101 (e.g., the processor 120) may output, in various manners such as voice, vibration, or pop-up, such a message so that the user can recognize it. If the electronic device 101 is not moved from the first area 910 to the second area 920 (step 814), the electronic device 101 (e.g., the processor 120) may remove the provided message (e.g., in case of a pop-up).

According to various embodiments, after continuously entering the first area 910 and the second area 920, the electronic device 101 (e.g., the processor 120) may determine whether it moves out of the second area 920 and the first area 910 (movement 942). This case may include a case in which the user enters a specific area, stays for a moment, and then goes away. For example, this may correspond to a case where the user enters a store to purchase a product but leaves the store without purchasing it. When the electronic device 101 enters the second area 920, the electronic device 101 (e.g., the processor 120) may provide information corresponding to a specific place. If it is determined that the electronic device 101 is staying in the second area 920 for a predetermined time, the electronic device 101 (e.g., the processor 120) may generate information corresponding to the specific place and output the generated information via the display 160. The information corresponding to the specific place may include information (e.g., price, time, etc.) about various products (e.g., menu, kind, etc.) provided in the specific place. In addition, this information may include various kinds of information depending on a type or category of the shop or service business, and the like. The electronic device 101 may output, in various manners such as voice, vibration, or pop-up, such information so that the user can recognize it.

According to various embodiments, after continuously entering the first area 910, the second area 920, and the third area 930, the electronic device 101 (e.g., the processor 120) may determine whether it moves out of the third area 930, the second area 920, and the first area 910 (movement 943). This may correspond to a case in which the user enters a store and then purchases a product or inquires of a seller. When the electronic device 101 enters the third area 930, the electronic device 101 (e.g., the processor 120) may provide additional information. If it is determined that the electronic device 101 is staying in the third area 930 for a predetermined time, the electronic device 101 (e.g., the processor 120) may generate additional information corresponding to the specific place and output the generated information through the display 160. The additional information may include various kinds of information for reducing a cost of the user, such as a membership card, a discount card, a coupon, or an event, or information about various benefits providable to the user. In addition, the additional information may include various kinds of information depending on a type or category of the shop or service business, and the like. The electronic device 101 may notify the output of additional information in various manners such as voice, vibration, or pop-up so that the user can recognize it.

According to various embodiments, based at least on the identification information and the collected location information, the electronic device 101 (e.g., the processor 120) may determine whether the electronic device 101 leaves the first area 910 after staying in the second area 920 or the third area 930 for a predetermined time or more (movement 944).

For example, when the electronic device 101 stays in the second area 920 or the third area 930 for more than a predetermined time, the electronic device 101 (e.g., the processor 120) may provide additional information by determining that the user purchases a product or performs any other consumption at a store. The additional information may include various kinds of information for reducing a cost of the user, such as a membership card, a discount card, a coupon, or an event, or information about various benefits providable to the user. In addition, the additional information may include a gratitude message for a visit and purchase, or a message informing that additional services will be offered for a revisit.

The term "module" used in this disclosure may mean a unit including, for example, one or a combination of hardware, software, and firmware. The term "module" may be interchangeably used with other terms, for example, such as unit, logic, logical block, component, or circuit. The "module" may be the minimum unit, or a part thereof, of an integrally constructed component. The "module" may be the minimum unit, or a part thereof, for performing one or more functions. The "module" may be implemented mechanically or electronically. For example, according to the present disclosure, the "module" may include at least one of an application-specific integrated circuit (ASIC) chip, field-programmable gate arrays (FPGAs), and a programmable-logic device, which are known or to be developed later and perform particular functions.

According to various embodiments, at least a part of the device (e.g., modules or functions thereof) or the method (e.g., operations) may be implemented, for example, as instructions stored in a non-transitory computer-readable storage medium in a programming module form. When the instructions are executed by a control circuit, the control circuit may perform a function corresponding to the instructions. The computer-readable storage medium may be, for example, the memory 360. At least a part of the programming module may be implemented (e.g., executed) by, for example, the control circuit. At least a part of the programming module may include, for example, a module, a program, a routine, a set of instructions, or a process for performing one or more functions.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction. In addition, the program instructions may include high class language codes, which can be executed in a computer by using an interpreter, as well as machine codes made by a compiler. The hardware devices described above may be configured to operate as one or more software modules to perform the operations of the various embodiments, and vice versa.

A module or programming module according to various embodiments may include or exclude at least one of the above-discussed components or further include any other component. The operations performed by the module, programming module, or any other component according to various embodiments may be executed sequentially, in parallel, repeatedly, or by a heuristic method. Additionally, some operations may be executed in different orders or omitted, or any other operation may be added. According to various embodiments, instructions stored in a storage medium are configured to cause, when executed by at least one processor, the at least one processor to perform at least one operation, the instructions may include a first set of instructions for acquiring, by using the communication module, a signal from an external electronic device, the signal including one or more identification information corresponding to the external electronic device, a second set of instructions for detecting, by using the sensor, a movement of the electronic device, a third set of instructions for selecting first identification information of the at least one identification information when the movement satisfies a first condition, a fourth set of instructions for selecting second identification information of the at least one identification information when the movement satisfies a second condition, and a fifth set of instructions for providing service information corresponding to the selected first or second identification information. In addition, the instructions may include a first instruction set for acquiring identification information corresponding to a place of a first external electronic device from the first external electronic device located in proximity to the electronic device, a second instruction set for transmitting location information to a second external electronic device, and a third instruction set for receiving service information corresponding to the identification information from the second external electronic device.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

The invention claimed is:

1. An electronic device comprising:
a first communication module;
a second communication module;
a memory configured to store location information of the electronic device; and
a processor,
wherein the processor is configured to:
acquire, from a first external electronic device located at a short distance from the electronic device, business information corresponding to a place where the first external electronic device is located, by using the first communication module, wherein the business information includes at least one of a name of a shop corresponding to the place, or a business type of the shop;
transmit the business information and the location information to a second external electronic device by using the second communication module; and
receive service information corresponding to the business information from the second external electronic device by using the second communication module, and
wherein the processor is further configured to:
collect and store movement information and an associated strength of a signal received from the first external electronic device,
identify a current location of the electronic device by using the collected movement information and the strength of the signal received from the first external electronic device, and
determine whether a movement to the current location where the first external electronic device is located occurs when the signal is received from the first external electronic device or if the movement indicates that the electronic device is passing the first external electronic device.

2. The electronic device of claim 1, further comprising:
a sensor,
wherein the processor is configured to acquire the location information by using the sensor before transmitting the location information when the acquired business information satisfies a specified condition.

3. The electronic device of claim 2, wherein the processor is configured to:
determine whether the business information includes a specified business type or specified shop name related to the electronic device, and
determine that the specified condition is satisfied, when the business information includes the specified business type or specified shop name.

4. The electronic device of claim 1, wherein the processor is configured to:
output service information corresponding to a first area through a display when the identified current location is within the first area apart from the first external electronic device by a first predetermined distance,
output service information corresponding to a second area through the display when the identified current location is within the second area apart from the first external electronic device by a second predetermined distance, and
output service information corresponding to a third area through the display when the identified current location is within the third area apart from the first external electronic device by a third predetermined distance, and
wherein the third area is contained within and smaller than the second area, and the second area is contained within and smaller than the first area.

5. The electronic device of claim 4, wherein the processor is configured to:
acquire the location information by periodically detecting a movement of the electronic device in the first area, the second area, or the third area,
transmit the acquired location information and the acquired business information to the second external electronic device, and
receive service information corresponding to the detected movement from the second external electronic device to provide the received service information through the display.

6. The electronic device of claim 4, wherein the service information corresponding to the first area includes a welcome message for a visit to the place, the service information corresponding to the second area includes information corresponding to the place, and the service information corresponding to the third area includes additional information provided at the place.

7. The electronic device of claim 1, wherein the processor is configured to check a remaining power amount of a battery of the electronic device, and
configured not to provide the received service information when the remaining power amount is smaller than a predetermined value.

8. A method for providing service information in an electronic device, the method comprising operations of:
acquiring, from a first external electronic device located at a short distance from the electronic device, business information corresponding to a place where the first external electronic device is located, wherein the business information includes at least one of a name of a shop corresponding to the place, or a business type of the shop;
transmitting the business information and location information of the electronic device to a second external electronic device;
receiving service information corresponding to the business information from the second external electronic device;
collecting and storing movement information and an associated strength of a signal received from the first external electronic device;
identifying a current location of the electronic device by using the collected movement information and the strength of the signal received from the first external electronic device; and
determining whether a movement to the current location where the first external electronic device is located occurs when the signal is received from the first external electronic device or if the movement indicates that the electronic device is passing the first external electronic device.

9. The method of claim 8, further comprising an operation of:
acquiring the location information by using at least one sensor equipped in the electronic device before transmitting the location information when the acquired business information satisfies a specified condition.

10. The method of claim 9, wherein the operation of acquiring the location information includes operations of:
determining whether the acquired business information includes a specified business type or specified shop name related to the electronic device, and
determining that the specified condition is satisfied, when the business information includes the specified business type or specified shop name.

11. The method of claim 8, wherein the operation of receiving the service information includes an operation of receiving, as at least a part of the service information, at least one piece of content corresponding to the acquired business information and the location information.

12. The method of claim 8, wherein the operation of receiving the service information includes operations of:
outputting service information corresponding to a first area through a display when the identified current location is within the first area apart from the first external electronic device by a first predetermined distance,
outputting service information corresponding to a second area through the display when the identified current location is within the second area apart from the first external electronic device by a second predetermined distance, and
outputting service information corresponding to a third area through the display when the identified current location is within the third area apart from the first external electronic device by a third predetermined distance, and
wherein the third area is contained within and smaller than the second area, and the second area is contained within and smaller than the first area.

13. The method of claim 12, wherein the current location is acquired by periodically detecting a movement of the electronic device in the first area, the second area, or the third area.

* * * * *